United States Patent
Yamazaki et al.

(10) Patent No.: US 9,449,569 B2
(45) Date of Patent: Sep. 20, 2016

(54) LIQUID CRYSTAL DISPLAY DEVICE AND METHOD FOR DRIVING LIQUID CRYSTAL DISPLAY DEVICE

(71) Applicant: Semiconductor Energy Laboratory Co., Ltd., Kanagawa-ken (JP)

(72) Inventors: Shunpei Yamazaki, Tokyo (JP); Jun Koyama, Kanagawa (JP); Yoshiharu Hirakata, Kanagawa (JP); Hiroyuki Miyake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 334 days.

(21) Appl. No.: 13/940,788

(22) Filed: Jul. 12, 2013

(65) Prior Publication Data

US 2014/0015868 A1  Jan. 16, 2014

(30) Foreign Application Priority Data

Jul. 13, 2012 (JP) .................................. 2012-157405

(51) Int. Cl.
  *G09G 3/36* (2006.01)
  *G02F 1/137* (2006.01)

(52) U.S. Cl.
  CPC .......... *G09G 3/3614* (2013.01); *G09G 3/3648* (2013.01); *G02F 2001/13793* (2013.01); *G09G 2310/0205* (2013.01); *G09G 2310/0218* (2013.01); *G09G 2310/0235* (2013.01)

(58) Field of Classification Search
  CPC ............. G09G 3/3413; G09G 3/3607; G09G 3/3659; G09G 3/3611; G09G 3/3614
  USPC .............................. 345/88, 102, 690, 96, 100
  See application file for complete search history.

(56) References Cited

U.S. PATENT DOCUMENTS 5,731,856 A   3/1998  Kim et al.
5,744,864 A   4/1998  Cillessen et al.
(Continued)

FOREIGN PATENT DOCUMENTS

EP   1737044 A   12/2006
EP   2226847 A   9/2010
(Continued)

OTHER PUBLICATIONS

Fortunato.E et al., "Wide-Bandgap High-Mobility ZnO Thin-Film Transistors Produced at Room Temperature," Appl. Phys. Lett. (Applied Physics Letters, Sep. 27, 2004, vol. 85, No. 13, pp. 2541-2543.

(Continued)

*Primary Examiner* — Calvin C Ma
(74) *Attorney, Agent, or Firm* — Husch Blackwell LLP

(57) ABSTRACT

A liquid crystal display device capable of consuming less power and a method for driving the liquid crystal display device are provided. The liquid crystal display device includes a pixel portion, a light supply portion sequentially supplying lights of a plurality of hues to the pixel portion, a counter counting the number of frame periods, a signal generator determining timing of inverting the polarity of an image signal every plural consecutive frame periods by using data on the number of frame periods counted by the counter, and a controller inverting the polarity of the image signal in accordance with the timing. A plurality of pixels are provided in the pixel portion. The image signal whose polarity is inverted every plural frame periods is input to the plurality of pixels.

12 Claims, 14 Drawing Sheets

(56) References Cited

U.S. PATENT DOCUMENTS

| | | |
|---|---|---|
| 5,821,910 A | 10/1998 | Shay |
| 5,900,886 A | 5/1999 | Shay |
| 6,005,543 A | 12/1999 | Kimura |
| 6,147,668 A * | 11/2000 | Eglit ............................... 345/99 |
| 6,166,714 A | 12/2000 | Kishimoto |
| 6,294,274 B1 | 9/2001 | Kawazoe et al. |
| 6,317,109 B1 | 11/2001 | Lee |
| 6,496,172 B1 | 12/2002 | Hirakata |
| 6,535,191 B1 | 3/2003 | Miyachi |
| 6,563,174 B2 | 5/2003 | Kawasaki et al. |
| 6,590,552 B1 | 7/2003 | Yokoyama et al. |
| 6,727,522 B1 | 4/2004 | Kawasaki et al. |
| 7,002,541 B2 | 2/2006 | Yanagi et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,113,154 B1 | 9/2006 | Inukai |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,106,865 B2 | 1/2012 | Yoshida et al. |
| 8,159,449 B2 | 4/2012 | Kimura et al. |
| 8,284,218 B2 | 10/2012 | Yoshida |
| 2001/0024187 A1 | 9/2001 | Sato et al. |
| 2001/0046027 A1 | 11/2001 | Tai et al. |
| 2002/0056838 A1 | 5/2002 | Ogawa |
| 2002/0075205 A1 | 6/2002 | Kimura et al. |
| 2002/0080131 A1 | 6/2002 | Fujino |
| 2002/0093473 A1 | 7/2002 | Tanaka et al. |
| 2002/0132454 A1 | 9/2002 | Ohtsu et al. |
| 2002/0180675 A1 | 12/2002 | Tobita et al. |
| 2003/0156104 A1 | 8/2003 | Morita |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2004/0252115 A1 | 12/2004 | Boireau |
| 2005/0017302 A1 | 1/2005 | Hoffman |
| 2005/0140699 A1 | 6/2005 | Ito |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0119755 A1 | 6/2006 | Senda et al. |
| 2006/0163583 A1 | 7/2006 | Jiroku |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0001963 A1 | 1/2007 | Koma |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0080909 A1 | 4/2007 | Jeon et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0152921 A1 | 7/2007 | Osame |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0273682 A1 | 11/2007 | Yi et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0224904 A1 | 9/2008 | Fujimura |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284719 A1 | 11/2008 | Yoshida |
| 2008/0296568 A1 | 12/2008 | Ryu et al. |
| 2009/0015533 A1 | 1/2009 | Fujita et al. |
| 2009/0058888 A1 | 3/2009 | Chou et al. |
| 2009/0068773 A1 | 3/2009 | Lai et al. |
| 2009/0072226 A1 | 3/2009 | Koo et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0213042 A1 | 8/2009 | Hagino et al. |
| 2009/0278122 A1 | 11/2009 | Hosono et al. |
| 2009/0280600 A1 | 11/2009 | Hosono et al. |
| 2009/0310077 A1 | 12/2009 | Kim et al. |
| 2010/0033414 A1 | 2/2010 | Jeong et al. |
| 2010/0065844 A1 | 3/2010 | Tokunaga |
| 2010/0066724 A1 | 3/2010 | Huh et al. |
| 2010/0092800 A1 | 4/2010 | Itagaki et al. |
| 2010/0109002 A1 | 5/2010 | Itagaki et al. |
| 2010/0123711 A1 | 5/2010 | Kawabe |
| 2010/0207966 A1 * | 8/2010 | Hosaka .......................... 345/690 |
| 2010/0315396 A1 | 12/2010 | Weng et al. |
| 2011/0031032 A1 | 2/2011 | Mourik et al. |
| 2011/0090183 A1 | 4/2011 | Yamazaki et al. |
| 2011/0148846 A1 | 6/2011 | Arasawa et al. |
| 2011/0157131 A1 | 6/2011 | Miyake |
| 2011/0199404 A1 | 8/2011 | Umezaki et al. |
| 2011/0210957 A1 | 9/2011 | Koyama et al. |
| 2011/0248970 A1 | 10/2011 | Koyama et al. |
| 2011/0248978 A1 | 10/2011 | Koyama et al. |
| 2011/0249037 A1 | 10/2011 | Koyama et al. |
| 2011/0285759 A1 * | 11/2011 | Sakai .................. G09G 3/3648 345/690 |
| 2011/0292088 A1 | 12/2011 | Toyotaka et al. |
| 2011/0310132 A1 | 12/2011 | Kurokawa et al. |
| 2011/0310133 A1 | 12/2011 | Koyama et al. |
| 2011/0316818 A1 | 12/2011 | Koyama et al. |
| 2012/0001953 A1 | 1/2012 | Hirakata et al. |
| 2012/0001954 A1 * | 1/2012 | Yamazaki et al. ............ 345/690 |
| 2012/0001955 A1 | 1/2012 | Yamazaki et al. |
| 2012/0002127 A1 | 1/2012 | Yamazaki et al. |

(56) References Cited

U.S. PATENT DOCUMENTS

| | | |
|---|---|---|
| 2012/0002132 A1 | 1/2012 | Yamazaki et al. |
| 2012/0002133 A1 | 1/2012 | Yamazaki et al. |
| 2012/0019567 A1 | 1/2012 | Yamazaki et al. |
| 2012/0026163 A1 | 2/2012 | Koyama et al. |
| 2012/0032996 A1 | 2/2012 | Miyke |
| 2012/0033151 A1 | 2/2012 | Toyotaka et al. |
| 2012/0050348 A1 | 3/2012 | Kurokawa et al. |
| 2012/0062614 A1 | 3/2012 | Miyke |
| 2012/0092587 A1 | 4/2012 | Wakimoto |
| 2012/0099293 A1 | 4/2012 | Miyairi |
| 2012/0120677 A1 | 5/2012 | Miyairi et al. |
| 2012/0127384 A1 | 5/2012 | Miyake et al. |
| 2012/0133648 A1 | 5/2012 | Hirakata |
| 2012/0154696 A1 | 6/2012 | Koyama |
| 2012/0162283 A1 | 6/2012 | Miyairi et al. |
| 2012/0162286 A1 | 6/2012 | Toyotaka |
| 2013/0235093 A1 | 9/2013 | Miyake |
| 2014/0015819 A1 | 1/2014 | Yamazaki et al. |
| 2014/0028645 A1 | 1/2014 | Yamazaki et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 5-251705 A | 9/1993 |
| JP | 8-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2002-323879 | 11/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-220685 A | 8/2006 |
| JP | 2008-145591 | 6/2008 |
| WO | WO 2004/114391 | 12/2004 |
| WO | WO 2005/033785 A1 | 4/2005 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 :.SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the $In_2O_3$—$Ga_2ZnO_4$—ZnO system at 1350°C.,", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)m$ (m = 3, 4, and 5), $InGaO_3(ZnO)3$, and $Ga_2O_3(ZnO)m$ (m = 7, 8, 9, and 16) in the $In_2O_3$—$ZnGa_2O_4$—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)5$ films,", Appl. Phys. Lett. (Applied Physics Letters) , Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT,", SID Digest '08 : SID International Symposium Digest of Technical Papers, May 20, 2008, vol. 39, pp. 633-636.

Lee.J et al., "World'S Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MOO_3$ As a Charge-Generation Layer,", Adv. Mater. (Advanced Materials), 2006, vol. 18, No. 3, pp. 339-342.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

(56) References Cited

OTHER PUBLICATIONS

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.

Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AMOLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW'06.: Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in the IN2O3 and SC2O3-A2O3-BO Systems [A; Fe, Ga, or Al; B: Mg, Mn, Fe, Ni, Cu,or Zn] at Temperatures Over 1000°C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B. (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

Tsuda, K. et al., "Ultra Low Power Consumption Technologies for Mobile TFT-LCDs," IDW '02: Proceedings of the 9th International Display Workshops, Dec. 4, 2002, pp. 295-298.

\* cited by examiner

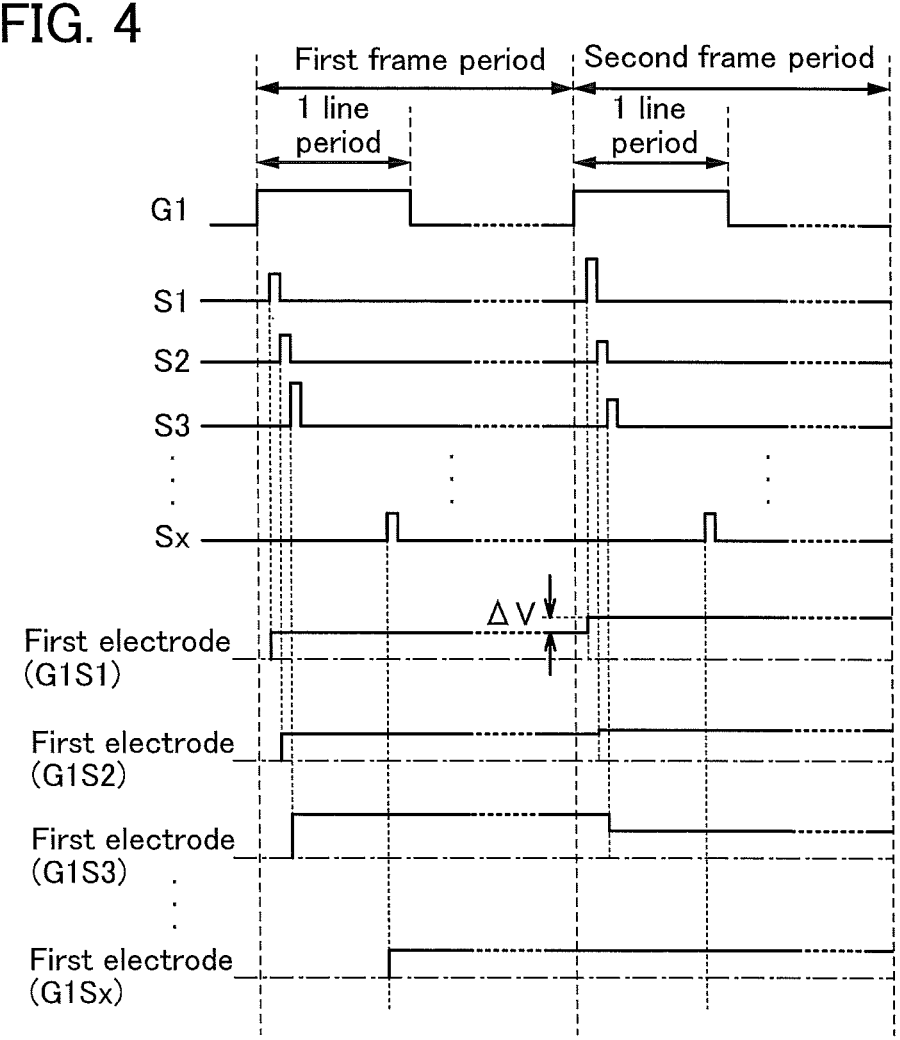

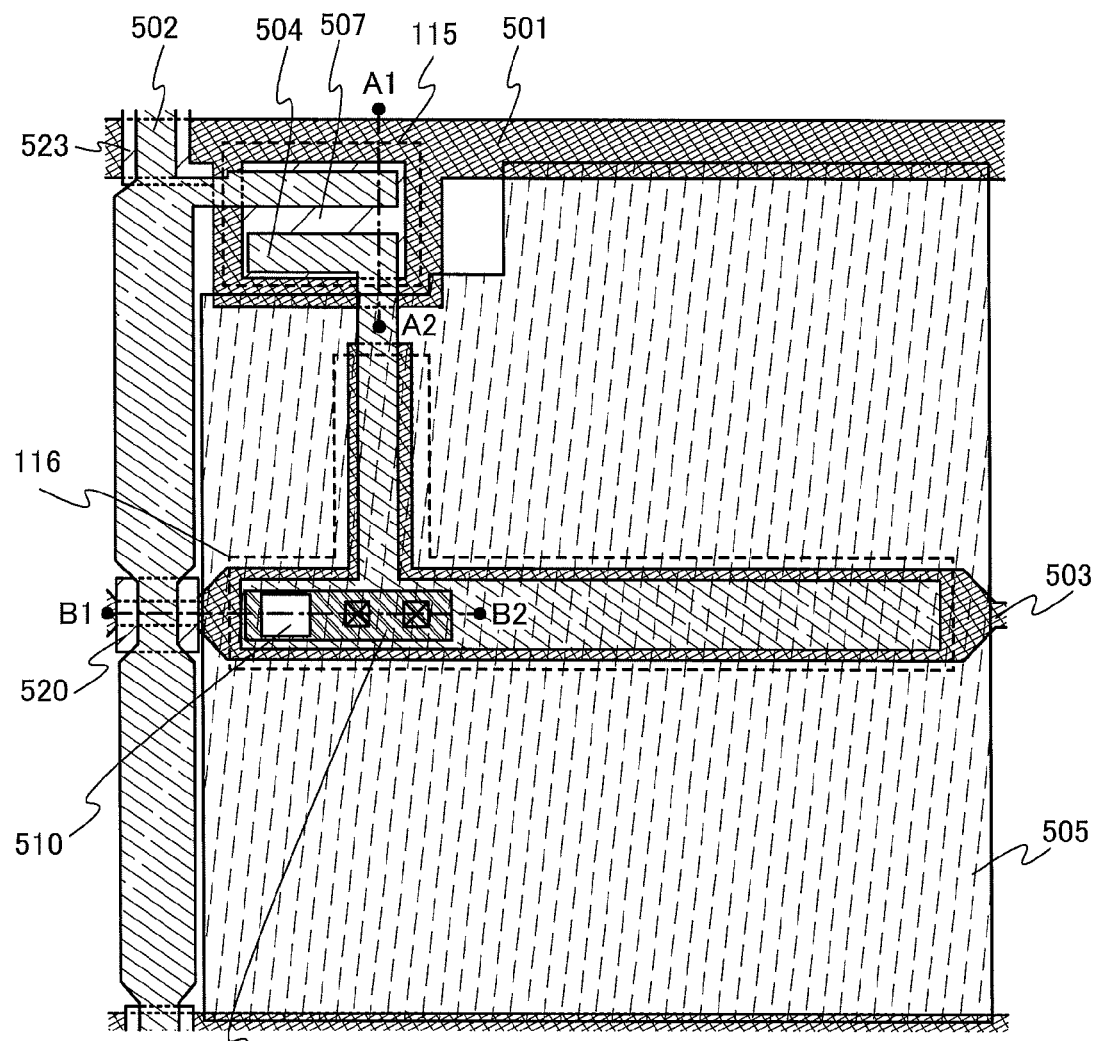
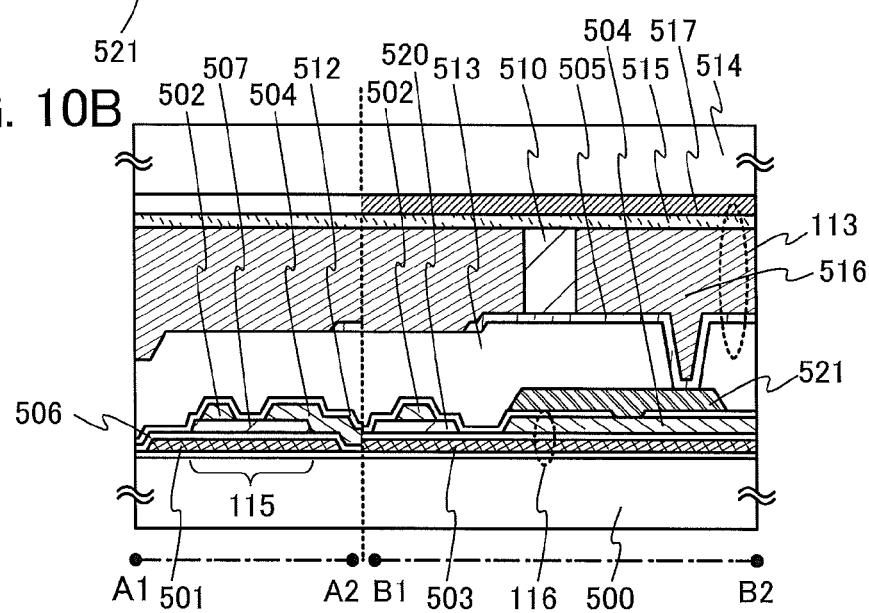

LIQUID CRYSTAL DISPLAY DEVICE AND METHOD FOR DRIVING LIQUID CRYSTAL DISPLAY DEVICE

BACKGROUND OF THE INVENTION

1. Field of the Invention

The present invention relates to an active-matrix liquid crystal display device including a transistor in a pixel and a method for driving the liquid crystal display device.

2. Description of the Related Art

Field sequential (FS) driving is a method for driving a liquid crystal display device displaying a color image by sequentially lighting a plurality of light sources emitting lights of different hues. It is not necessary to use a color filter in the FS driving, which leads to reduction in light loss within a panel. In the case of a transmissive liquid crystal display device, the power consumption of a light supply portion such as a backlight or a front light greatly influence the entire power consumption of the liquid crystal display device; thus, the FS driving is one of effective methods for reducing the power consumption of the liquid crystal display device.

Patent Document 1 discloses a field sequential color method in which in a data write period, voltages having the same polarity are sequentially applied in synchronization with lighting periods of red, green, and blue backlights to generate red, green, and blue display images, and then, voltages having a polarity opposite to the polarity of the voltages used for generating display images are applied.

REFERENCE

Patent Document 1: Japanese Published Patent Application No. 2008-145591

SUMMARY OF THE INVENTION

In the case where FS driving is employed as described above, the power consumption of a liquid crystal display device can be made lower than that of a liquid crystal display device displaying a color image by using a color filter. However, along with the spread of mobile electronic devices, the degree of demand for reduction in power consumption of a liquid crystal display device becomes higher and more reduction in power consumption is demanded.

In view of the above technical background, it is an object of the present invention to provide a liquid crystal display device capable of consuming less power and a method for driving the liquid crystal display device.

One embodiment of the present invention includes a first structure in which the polarity of an image signal input to a pixel is inverted not every frame period but every plural consecutive frame periods. Specifically, in one pixel, in plural consecutive frame periods, the potential of an image signal having a positive polarity is supplied to a first electrode of a liquid crystal element included in the pixel, and in the next plural consecutive frame periods, the potential of an image signal having a negative polarity is supplied to the first electrode of the liquid crystal element included in the pixel.

Like one embodiment of the present invention, in the case where image signals having the same polarity are input to a pixel in a first frame period and a second frame period that are consecutive, a potential difference between an image signal input to and held in the pixel in the first frame period and an image signal input to the pixel in the second frame period can be made small compared to the case where image signals having opposite polarities are input to a pixel. Thus, in one embodiment of the present invention, in the second frame period, power required to input an image signal to the pixel can be reduced, and time required to input an image signal to the pixel can be shortened. In addition, in one embodiment of the present invention, the polarity of an image signal input to the pixel is inverted every plural consecutive frame periods; thus, deterioration (referred to as burn-in) of a liquid crystal material can be prevented.

One embodiment of the present invention further includes a second structure where hues of lights supplied to a pixel portion are different from each other in plural consecutive frame periods. With the second structure, a full-color image using a plurality of different hues can be displayed without using a color filter. Thus, in one embodiment of the present invention, the use efficiency of light emitted from a light supply portion can be increased, and the power consumption of the liquid crystal display device can be reduced.

Alternatively, one embodiment of the present invention may include a third structure instead of the second structure. In the third structure, hues of lights supplied to the pixel portion are different from each other between a plurality of regions of the pixel portion and plural consecutive frame periods.

In one embodiment of the present invention, with the third structure, like the second structure, the use efficiency of light emitted from the light supply portion can be increased, and the power consumption of the liquid crystal display device can be reduced. Further, it is possible to prevent images of a plurality of colors from being perceived separately without being synthesized. In other words, in one embodiment of the present invention, with the third structure, in addition to the effects of the second structure, it is possible to obtain an effect of preventing images of a plurality of colors from being perceived separately without being synthesized (hereinafter this phenomenon is called color break), which has tended to occur in displaying a moving image.

Note that in the second structure and the third structure, unlike in the case where light of a single color is used in combination with a color filter, lights of a plurality of hues are sequentially switched and supplied to the pixel portion. Thus, in one embodiment of the present invention, it is necessary to set frame frequency high compared to the case where light of a single color is used in combination with a color filter. However, in one embodiment of the present invention, as described above, time required to input an image signal can be shortened by the first structure. Consequently, the liquid crystal display device can operate at high frame frequency and is suitable for the second structure and the third structure according to one embodiment of the present invention where a full-color image is displayed using lights of a plurality of hues.

According to one embodiment of the present invention, it is possible to provide a liquid crystal display device capable of consuming less power and a method for driving the liquid crystal display device.

BRIEF DESCRIPTION OF THE DRAWINGS

In the accompanying drawings:

FIG. 4 is a timing chart of a pixel portion;

FIGS. 10A and 10B are a top view and a cross-sectional view of a pixel;

DETAILED DESCRIPTION OF THE INVENTION

Embodiments of the present invention will be described in detail below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments.

Embodiment 1

Figure 1A:
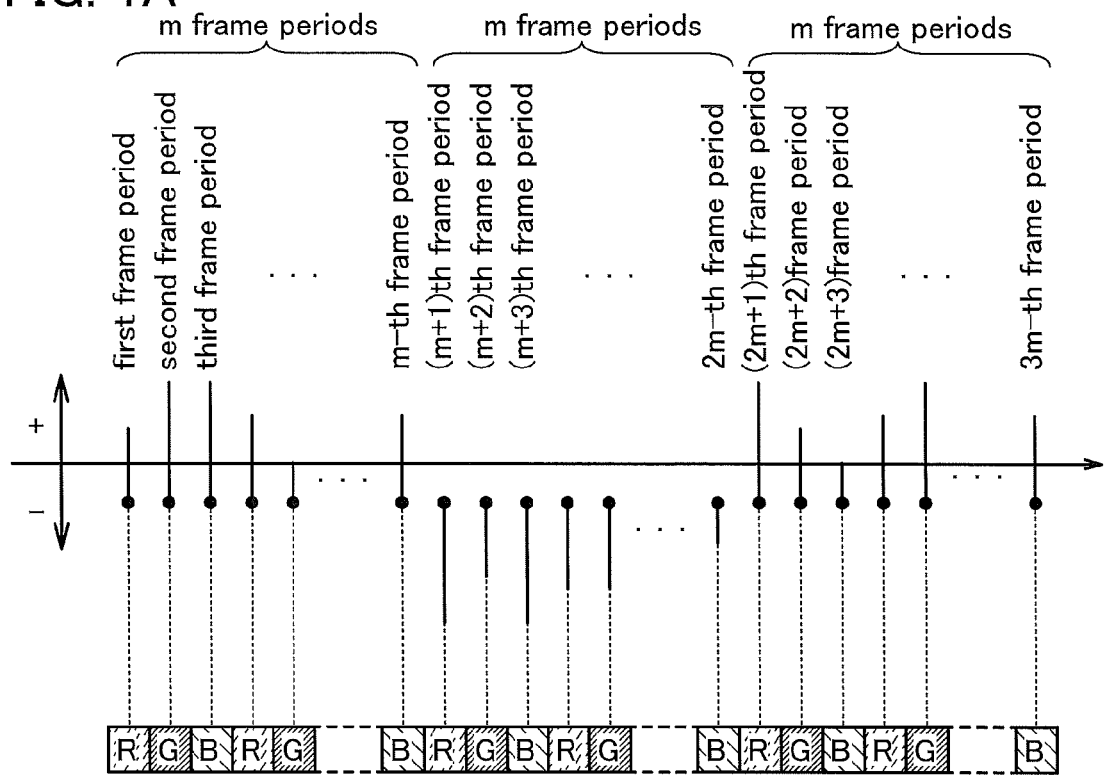
FIGS. 1A and 1B each schematically illustrate an example of a driving method.

FIG. 1A schematically illustrates an example of a method for driving a liquid crystal display device according to one embodiment of the present invention. FIG. 1A illustrates the potential of an image signal input to given one pixel included in a pixel portion in each frame period and the hue of light supplied to the one pixel from a light supply portion in each frame period.

In one embodiment of the present invention, as illustrated in FIG. 1A, in first to m-th frame periods (m is a natural number of 2 or more), an image signal having a positive (+) polarity is input to a pixel. In (m+1)th to 2m-th frame periods that appear next, an image signal having a negative (−) polarity is input to the pixel. In 2(m+1)th to 3m-th frame periods that appear next, an image signal having a positive (+) polarity is input to the pixel.

As illustrated in FIG. 1A, in one embodiment of the present invention, the polarity of an image signal input to a pixel is inverted every consecutive m frame periods. The potential of the image signal input to the pixel is supplied to a liquid crystal element. Specifically, the liquid crystal element includes a first electrode, a second electrode, and a liquid crystal layer that is between the first electrode and the second electrode, is supplied with voltage, and contains a liquid crystal material. The potential of the image signal is applied to the first electrode. Alignment of liquid crystal molecules in the liquid crystal material is changed in accordance with the level of voltage across the first electrode and the second electrode, and transmittance is changed. Thus, by controlling the transmittance of the liquid crystal element in accordance with the potential of the image signal, gradation is expressed in the pixel.

Note that a reference potential such as a ground potential (referred to as a reference potential Vcom) is applied to the second electrode of the liquid crystal element. The image signal has a positive polarity when the image signal has a potential that is higher than the reference potential Vcom. The image signal has a negative polarity when the image signal has a potential that is lower than the reference potential Vcom. Note that depending on image data contained in the image signal, the potential of the image signal might be equal to the reference potential Vcom. In the case where the potential of the image signal is equal to the reference potential Vcom, the image signal can be regarded as an image signal having a positive or negative polarity.

Note that in FIG. 1A, the polarity of an image signal is inverted every m frame periods; however, the number of frame periods during which the image signal has a positive polarity is not necessarily equal to the number of frame periods during which the image signal has a negative polarity.

In one embodiment of the present invention, the polarity of an image signal is inverted every plural consecutive frame periods; thus, a potential difference between an image signal input to and held in a pixel in a first frame period and an image signal input to the pixel in a second frame period can be made small compared to the case where the polarity of an image signal is inverted every frame period. Thus, in one embodiment of the present invention, compared to the case where the polarity of an image signal is inverted every frame period, in the second frame period, power required to input an image signal to the pixel can be reduced, and time required to input an image signal to the pixel can be shortened. In addition, in one embodiment of the present invention, the polarity of an image signal input to the pixel is inverted every plural consecutive frame periods; thus, deterioration (burn-in) of a liquid crystal material can be prevented.

Note that in order to prevent deterioration of the liquid crystal material, it is preferable that the total length of m frame periods during which image signals have the same polarity be shorter than or equal to one second.

In addition, in one embodiment of the present invention, as illustrated in FIG. 1A, the hue of light supplied from the light supply portion to given one pixel differs every frame period. Specifically, in FIG. 1A, red (R) light is supplied to the pixel in the first frame period, green (G) light is supplied to the pixel in the second frame period, and blue (B) light is supplied to the pixel in a third frame period.

In one embodiment of the present invention, lights of different hues are sequentially supplied to the pixel, so that a full-color image can be displayed. Note that a full-color image means an image displayed with color gradations of plural colors of different hues.

With the structure, a full-color image using a plurality of different hues can be displayed without using a color filter. Thus, in one embodiment of the present invention, the use efficiency of light emitted from the light supply portion can be increased, and the power consumption of the liquid crystal display device can be reduced. Further, in one embodiment of the present invention, one pixel can display an image corresponding to a plurality of colors; thus, a high-definition image can be displayed compared to the case where a color filter is used. Specifically, it is possible to achieve a liquid crystal display device with a high definition of approximately 150 to 210 ppi.

Note that in the case where a full-color image is displayed by sequential supply of lights of different hues to the pixel, it is necessary to set frame frequency high compared to the case where light of a single color is used in combination with a color filter. For example, if frame frequency at the time when light of a single color is used in combination with a color filter is 60 Hz, frequency for switching the hues of lights at the time when lights corresponding to red, green, and blue are used is three times the frame frequency (180 Hz). However, in one embodiment of the present invention, since time required to input an image signal can be shortened as described above, the image signal can be input to the pixel portion even at high frame frequency.

Note that in FIG. 1A, lights of red (R), green (G), and blue (B) are supplied from the light supply portion to the pixel; however, one embodiment of the present invention is not limited to such a structure. In one embodiment of the present invention, the colors of lights supplied from the light supply portion to the pixel can be set optionally. For example, in one embodiment of the present invention, it is possible to use lights of red (R), green (G), blue (B), and white (W), lights of red (R), green (G), blue (B), and yellow (Y), or lights of cyan (C), magenta (M), and yellow (Y).

Note that in the liquid crystal display device according to one embodiment of the present invention, a period during which an image signal having a potential that is equal to the reference potential Vcom is input to a pixel (hereinafter referred to as a reset period) may be provided between a plurality of frame periods during which an image signal having a positive polarity is input and a plurality of frame periods during which an image signal having a negative polarity is input.

Figure 1B:
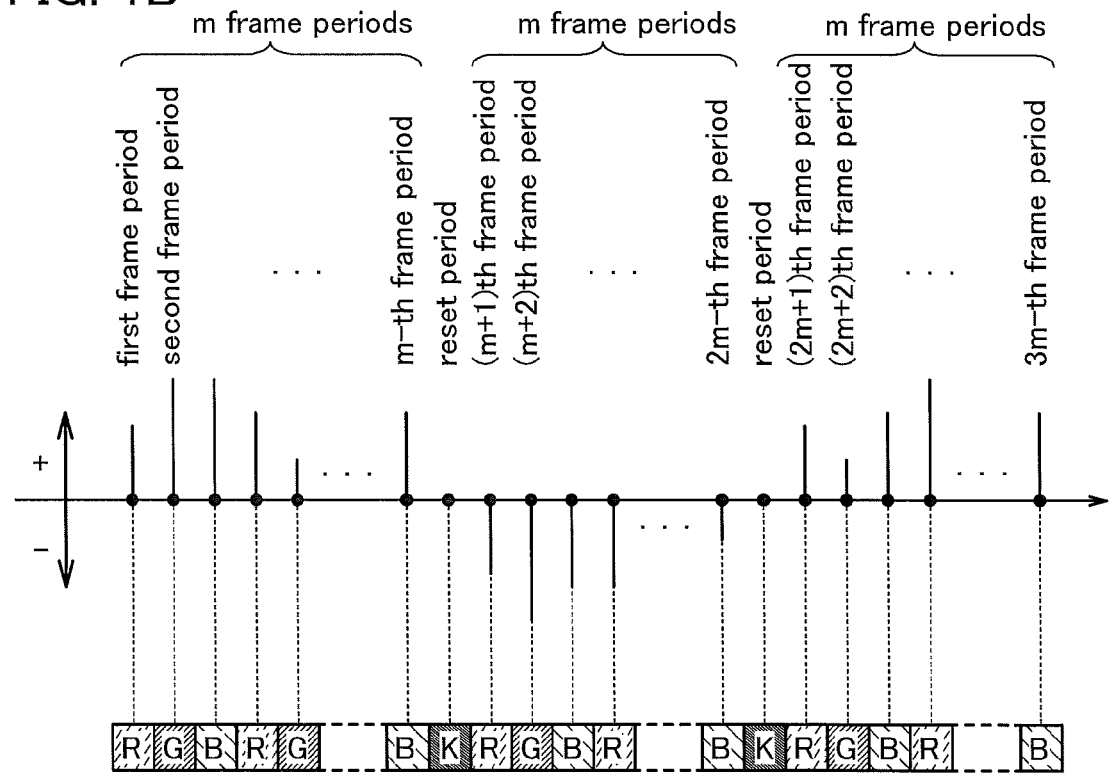

FIG. 1B schematically illustrates an example of a method for driving a liquid crystal display device according to one embodiment of the present invention at the time when a reset period is provided. FIG. 1B illustrates the potential of an image signal input to given one pixel included in a pixel portion in each frame period and the hue of light supplied to the one pixel from a light supply portion in each frame period.

In FIG. 1B, in first to m-th frame periods (m is a natural number of 2 or more), an image signal having a positive (+) polarity is input to a pixel. Next, after a reset period is provided, in (m+1)th to 2m-th frame periods that appear next, an image signal having a negative (−) polarity is input to the pixel. Next, after a reset period is provided, in 2(m+1)th to 3m-th frame periods that appear next, an image signal having a positive (+) polarity is input to the pixel.

In the reset period, supply of light from the light supply portion to given one pixel is stopped (denoted by K in FIG. 1B). Such a structure can prevent an observer from viewing an image displayed by input of an image signal having a potential that is equal to the reference potential Vcom to the pixel.

In one embodiment of the present invention, as illustrated in FIG. 1B, provision of the reset period can reduce power required to input an image signal to a pixel in an (m+1)th frame period and time required to input the image signal to the pixel can be shortened compared to the case where the (m+1)th frame period during which an image signal having a negative polarity is input to the pixel appears next to the m-th frame period during which an image signal having a positive polarity is input to the pixel.

Note that the reset period may be provided before supply of a power supply potential to a panel is stopped. In the case where the reset period is provided before supply of a power supply potential to the panel is stopped, continuous supply of the potential of an image signal to a liquid crystal element can be prevented in a period during which an image is not displayed. Thus, deterioration of the liquid crystal element can be prevented, and display of an afterimage due to an image signal input to a pixel before supply of a power supply potential to the panel is stopped on the pixel portion after the supply of a power supply potential is restarted can be prevented.

Figure 2:
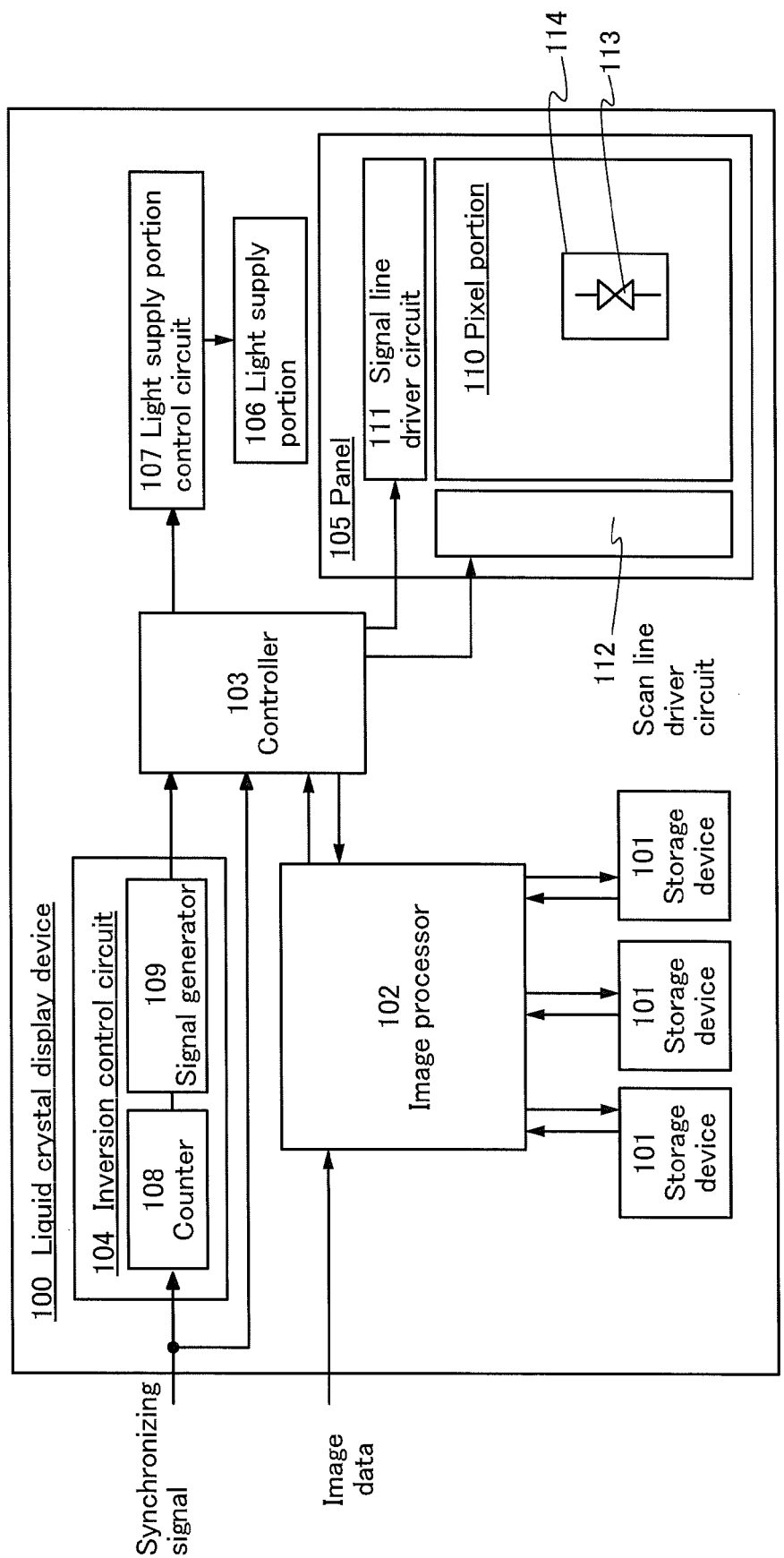
FIG. 2 is a block diagram illustrating a structure of a liquid crystal display device.

FIG. 2 is an example of a block diagram illustrating the structure of a liquid crystal display device according to one embodiment of the present invention. Although the block diagram attached to this specification shows elements classified according to their functions in independent blocks, it might be practically difficult to completely separate the elements according to their functions, and one element might be involved in a plurality of functions.

As illustrated in FIG. 2, a liquid crystal display device 100 according to one embodiment of the present invention includes a plurality of storage devices 101, an image processor 102, a controller 103, an inversion control circuit 104, a panel 105, a light supply portion 106, and a light supply portion control circuit 107.

Image data corresponding to a full-color image is input to the liquid crystal display device 100. The image data includes image data corresponding to a plurality of hues. The plurality of storage devices 101 each have a function of storing image data corresponding to a plurality of hues. The image processor 102 has a function of generating image signals corresponding to a plurality of hues by writing image data to the plurality of storage devices 101 and reading the image data from the plurality of storage devices 101.

As the storage device 101, for example, a storage circuit such as a dynamic random access memory (DRAM) or a static random access memory (SRAM) can be used. Alternatively, a video RAM (VRAM) may be used as the storage device 101.

The controller 103 has a function of giving the image processor 102 an instruction to generate an image signal. An image signal generated in the image processor 102 is transmitted to the panel 105 through the controller 103.

Note that in FIG. 2, the liquid crystal display device 100 includes the plurality of storage devices 101 and the image processor 102. However, in the liquid crystal display device according to one embodiment of the present invention, an image signal may be directly input. In that case, the liquid crystal display device 100 does not necessarily include the plurality of storage devices 101 and the image processor 102.

The controller 103 also has functions of generating control signals such as a start pulse signal SP, a latch signal LP, and a pulse width control signal PWC by using a synchronizing signal such as a vertical synchronizing signal or a horizontal synchronizing signal and supplying the control signals to the panel 105. A control signal such as a clock signal CK is also supplied to the panel 105.

The inversion control circuit 104 has a function of determining timing of inverting the polarity of an image signal by using a synchronizing signal. Specifically, in FIG. 2, the inversion control circuit 104 includes a counter 108 and a signal generator 109. The counter 108 has a function of counting the number of frame periods by using the pulse of a horizontal synchronizing signal. The signal generator 109 has a function of notifying timing of inverting the polarity of an image signal to the controller 103 so that the polarity of the image signal is inverted every plural consecutive frame periods by using data on the number of frame periods that is obtained in the counter 108.

The controller 103 also has a function of inverting the polarity of an image signal in accordance with the timing. Specifically, the polarity of an image signal may be inverted in the controller 103, or the polarity of an image signal may be inverted in the panel 105 in accordance with an instruction from the controller 103.

The panel 105 includes a pixel portion 110 in which each pixel includes a liquid crystal element, and driver circuits such as a signal line driver circuit 111 and a scan line driver circuit 112. The pixel portion 110 includes a plurality of pixels 114 each including a liquid crystal element 113.

Image signals corresponding to a plurality of hues that are input to the panel 105 are supplied to the signal line driver circuit 111. In addition, power supply potentials and control signals are supplied to the signal line driver circuit 111 and the scan line driver circuit 112.

Note that the control signals include a signal line driver circuit start pulse signal SP and a signal line driver circuit clock signal CK that control the operation of the signal line driver circuit 111; a latch signal LP; a scan line driver circuit start pulse SP and a scan line driver circuit clock signal CK that control the operation of the scan line driver circuit 112; a pulse width control signal PWC; and the like.

A plurality of light sources emitting lights of different hues are provided in the light supply portion 106. The controller 103 controls driving of the light sources in the light supply portion 106 through the light supply portion control circuit 107.

Specifically, the light supply portion 106 has a function of sequentially supplying lights corresponding to a plurality of hues to the pixel portion 110 by making the light sources emit lights sequentially or concurrently. The light source in the light supply portion 106 can be a cold cathode fluorescent lamp, a light-emitting diode (LED), an OLED element generating luminescence (electroluminescence) when an electric field is applied thereto, or the like.

Figure 3A:
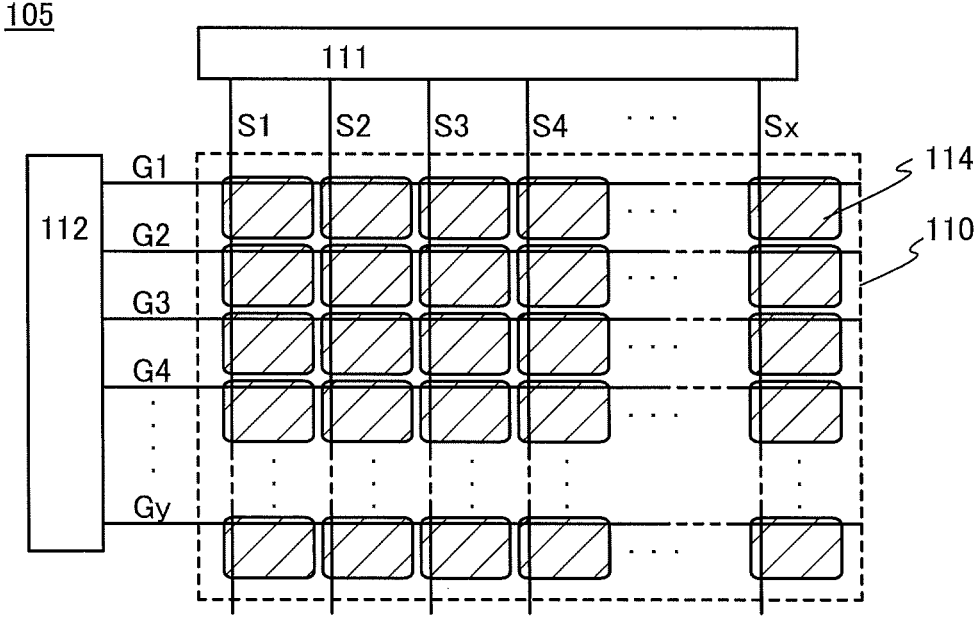
FIGS. 3A and 3B illustrate a structure of a panel.

Next, FIG. 3A illustrates a structure example of the panel 105.

In the panel 105 in FIG. 3A, the plurality of pixels 114, a plurality of scan lines G for selecting the pixels 114 row by row, and a plurality of signal lines S for supplying image signals to the selected pixels 114 are provided in the pixel portion 110. Input of signals to the scan lines G is controlled by the scan line driver circuit 112. Input of image signals to the signal lines S is controlled by the signal line driver circuit 111. Each of the plurality of pixels 114 is connected to at least one of the scan lines G and at least one of the signal lines S.

Note that the kinds and number of the lines in the pixel portion 110 can be determined by the structure, number, and position of the pixels 114. Specifically, in the case of the pixel portion 110 in FIG. 3A, the pixels 114 are arranged in a matrix of x columns×y rows, and signal lines S1 to Sx and scan lines G1 to Gy are provided in the pixel portion 110.

Figure 3B:
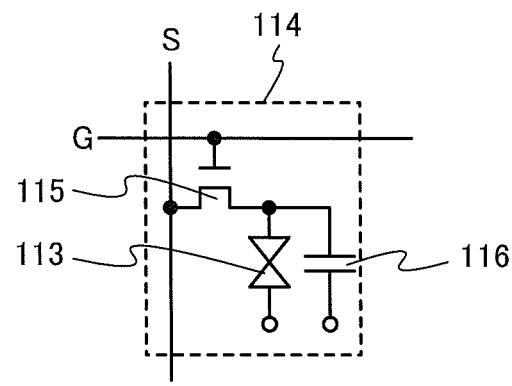

FIG. 3B illustrates a structure example of the pixel 114. Each of the pixels 114 includes the liquid crystal element 113, a transistor 115 controlling supply of an image signal to the liquid crystal element 113, and a capacitor 116 for holding voltage across a first electrode and a second electrode of the liquid crystal element 113. The liquid crystal element 113 includes a first electrode, a second electrode, and a liquid crystal layer that is provided between the first electrode and the second electrode, is supplied with voltage, and contains a liquid crystal material.

The transistor 115 controls whether to apply the potential of the signal line S to the first electrode of the liquid crystal element 113. The predetermined reference potential Vcom is applied to the second electrode of the liquid crystal element 113.

The specific connection relation between the transistor 115 and the liquid crystal element 113 is described below. The terms "source" and "drain" of a transistor interchange with each other depending on the channel type of the transistor or levels of potentials applied to terminals. In general, in an n-channel transistor, a terminal to which a low potential is applied is called a source, and a terminal to which a high potential is applied is called a drain. Further, in a p-channel transistor, a terminal to which a low potential is applied is called a drain, and a terminal to which a high potential is applied is called a source. In this specification, although the connection relation of the transistor is described assuming that the source and the drain are fixed in some cases for convenience, actually, the names of the source and the drain interchange with each other depending on the relation of the potentials.

A source of a transistor means a source region that is part of a semiconductor film functioning as an active layer or a source electrode that is connected to the semiconductor film. Similarly, a drain of a transistor means a drain region that is part of the semiconductor film or a drain electrode that is connected to the semiconductor film. A gate means a gate electrode.

Specifically, in FIG. 3B, a gate of the transistor 115 is connected to any one of the scan lines G1 to Gy. One of a source and a drain of the transistor 115 is connected to any one of the signal lines S1 to Sx. The other of the source and the drain of the transistor 115 is connected to the first electrode of the liquid crystal element 113.

Note that the pixel 114 may further include another circuit element such as a transistor, a diode, a resistor, a capacitor, or an inductor as needed.

In FIG. 3B, one transistor 115 is used in the pixel 114 as a switching element controlling input of an image signal to the pixel 114; however, a plurality of transistors functioning as one switching element may be used in the pixel 114. In the case where a plurality of transistors function as one switching element, the plurality of transistors may be connected to each other in parallel, in series, or in combination of parallel connection and series connection.

Note that in this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, a connection state does not always mean a direct connection state but includes an indirect connection state through a circuit element such as a wiring, a resistor, a diode, or a transistor so that current, voltage, or a potential can be supplied or transmitted.

Even when independent components are connected to each other in a circuit diagram, there is the case where one conductive film has functions of a plurality of components, such as the case where part of a wiring functions as an electrode. The term "connection" in this specification also means such a case where one conductive film has functions of a plurality of components.

Next, an operation example of the pixel portion 110 in FIG. 3A is described giving an example in which the pixel 114 has the structure in FIG. 3B. FIG. 4 is a timing chart of the pixel portion 110. Specifically, FIG. 4 illustrates changes over time in the potential of a signal supplied to the scan line G1, the potentials of image signals supplied to the signal lines S1 to Sx, and the potentials of the first electrodes of the pixels 114 connected to the scan line G1. In FIG. 4, the transistor 115 in the pixel 114 in FIG. 3B is an n-channel transistor.

First, in a first frame period, the scan line G1 is selected by input of a pulse signal to the scan line G1. In each of the plurality of pixels 114 connected to the selected scan line G1, the transistor 115 is turned on. When the transistors 115 are on (in one line period), the potentials of image signals are applied to the signal lines S1 to Sx. Electric charge is accumulated in the capacitors 116 through the transistors 115 that are on in accordance with the potentials of the image signals applied to the signal lines S1 to Sx. Further, the potentials of the image signals are applied to the first electrodes of the liquid crystal elements 113 through the transistors 115 that are on.

In the timing chart in FIG. 4, in a period during which the scan line G1 is selected in the first frame period, image signals having a positive polarity are sequentially input to all the signal lines S1 to Sx. Thus, image signals having a positive polarity are input to first electrodes G1S1 to G1 Sx in the pixels 114 that are connected to the scan line G1 and the signal lines S1 to Sx.

In the liquid crystal element 113, alignment of liquid crystal molecules is changed in accordance with the level of voltage across the first electrode and the second electrode, so that transmittance is changed. Accordingly, when the transmittance of the liquid crystal element 113 is controlled by the potential of an image signal, gradation can be expressed.

When input of image signals to the signal lines S1 to Sx is completed, selection of the scan line G1 is terminated. When the selection of the scan line G1 is completed, the transistors 115 in the pixels 114 including the scan line G1 are turned off. Then, the voltage across the first electrode and the second electrode is held in the liquid crystal element 113, so that expression of gradation is maintained.

Similarly, the scan lines G2 to Gy are sequentially selected, and the pixels 114 connected to the scan lines G2 to Gy are sequentially subjected to the same operation as that performed while the scan line G1 is selected. Through the above operations, an image corresponding to one hue can be displayed on the pixel portion 110.

Note that in one embodiment of the present invention, the scan lines G1 to Gy are not necessarily selected sequentially.

Next, in a second frame period, the scan line G1 is selected by input of a pulse signal to the scan line G1. In each of the plurality of pixels 114 connected to the selected scan line G1, the transistor 115 is turned on. When the transistors 115 are on, the potentials of image signals are applied to the signal lines S1 to Sx. Electric charge is accumulated in the capacitors 116 through the transistors 115 that are on in accordance with the potentials of the image signals applied to the signal lines S1 to Sx. Further, the potentials of the image signals are applied to the first electrodes of the liquid crystal elements 113 through the transistors 115 that are on.

In the timing chart in FIG. 4, in a period during which the scan line G1 is selected in the second frame period, image signals having a positive polarity are sequentially input to all the signal lines S1 to Sx as in the first frame period. Thus, image signals having a positive polarity are input to the first electrodes G1S1 to G1 Sx. The image signals having a positive polarity have been input to the pixels 114 in the first frame period; thus, in the second frame period, a potential difference $\Delta V$ between the potential of the image signal in the first frame period and the potential of the image signal in the second frame period can be reduced. In the second frame period, electric charge corresponding to the potential difference is stored and released in and from the first electrode and the capacitor 116; thus, time required to input an image signal to the pixel 114 can be shortened.

For example, assuming that an image signal having a potential of +5 V is applied to the first electrode G1S1 of the pixel 114 connected to the scan line G1 and the signal line S1 in the first frame period and an image signal having a potential of +8 V is applied to the first electrode G1S1 of the pixel 114 in the second frame period. In that case, if no electric charge leaks (an ideal state), the potential of +5 V is held in the first electrode G1S1 until the second frame period is started; thus, when the potential of +8 V is applied in the second frame period, electric charge corresponding to a potential difference $\Delta V$ of 3 V may be released from the first electrode G1S1 and the capacitor 116. However, for example, when an image signal having a potential of −8 V is applied in the second frame period, electric charge corresponding to a potential difference $\Delta V$ of 13 V should be released from the first electrode G1S1 and the capacitor 116. Thus, when the polarities of image signals input to the pixel 114 are the same in consecutive frame periods like one embodiment of the present invention, image signals can be input to the pixel portion at high speed compared to the case where the polarities of image signals input to the pixel 114 are inverted every frame period.

In particular, in the case of a horizontal electric field mode liquid crystal display device, a potential difference between an image signal having a positive polarity and an image signal having a negative polarity tends to be larger than that in another mode liquid crystal display device. For example, in the case where a liquid crystal layer includes a TN liquid crystal, the potential difference is about ten volts; in the case where the liquid crystal layer includes a liquid crystal exhibiting a blue phase, the potential difference is several tens of volts. Thus, in the case of a horizontal electric field mode liquid crystal display device, by inverting the polarity of an image signal every frame period, a potential difference between an image signal having a positive polarity and an image signal having a negative polarity becomes large. Accordingly, power required to input an image signal increases and time required to input an image signal becomes longer. However, in one embodiment of the present invention, as described above, image signals having the same polarity are consecutively input to a pixel in a plurality of frame periods. Accordingly, one embodiment of the present invention is effective in reducing power required to input an image signal and reducing time required to input an image signal in a horizontal electric field mode liquid crystal display device, such as an FFS mode liquid crystal display device, a blue phase mode liquid crystal display device, or an IPS mode liquid crystal display device.

When the transmittance of the liquid crystal element 113 is controlled by the potential of an image signal, gradation can be expressed.

When input of image signals to the signal lines S1 to Sx is completed, selection of the scan line G1 is terminated. When the selection of the scan line G1 is completed, the transistors 115 in the pixels 114 including the scan line G1 are turned off. Then, the voltage across the first electrode and the second electrode is held in the liquid crystal element 113, so that expression of gradation is maintained.

Similarly, the scan lines G2 to Gy are sequentially selected, and the pixels 114 connected to the scan lines G2 to Gy are sequentially subjected to the same operation as that performed while the scan line G1 is selected. Through the above operations, an image corresponding to one hue can be displayed on the pixel portion 110.

Note that FIG. 4 illustrates a timing chart of dot sequential driving in which image signals are sequentially input from the signal line driver circuit 111 to the signal lines S1 to Sx. However, the liquid crystal display device according to one embodiment of the present invention may employ line sequential driving in which image signals are concurrently input from the signal line driver circuit 111 to the signal lines S1 to Sx. Alternatively, the liquid crystal display device according to one embodiment of the present invention may employ a driving method in which image signals are sequentially input to every plural signal lines S.

In FIG. 4, the scan lines G are selected by progressive scan; however, interlace scan may be employed for selecting the scan lines G.

In addition, in FIG. 4, the polarities of image signals input to all the signal lines are the same in given one frame period. However, in one embodiment of the present invention, the polarities of image signals input to pixels may be inverted every other signal line in given one frame period.

Note that the response time of a liquid crystal from application of voltage to saturation of the change in transmittance is generally about ten milliseconds. Thus, the slow response of the liquid crystal tends to be perceived as a blur of a moving image. As a countermeasure, one embodiment of the present invention may employ overdriving in which voltage applied to the liquid crystal element 113 is temporarily increased so that alignment of the liquid crystal is changed quickly. By overdriving, the response speed of the liquid crystal can be increased, a blur of a moving image can be prevented, and the quality of the moving image can be improved.

Further, if the transmittance of the liquid crystal element 113 keeps changing without reaching a constant value after the transistor 115 is turned off, the relative permittivity of the liquid crystal also changes; accordingly, the voltage held in the liquid crystal element 113 easily changes. In particular, like one embodiment of the present invention, in the case where the capacitor 116 connected in parallel to the liquid crystal element 113 has small capacitance, the change in the voltage held in the liquid crystal element 113 tends to occur remarkably. However, by the overdriving, the response time can be shortened and therefore the change in the transmittance of the liquid crystal element 113 after the transistor 115 is turned off can be made small. Accordingly, even in the case where the capacitor 116 connected in parallel to the liquid crystal element 113 has small capacitance, the change in the voltage held in the liquid crystal element 113 after turning off the transistor 115 can be prevented.

In the liquid crystal display device according to one embodiment of the present invention, it is preferable to use a transistor whose off-state current is low as a switching element for holding electric charge accumulated in the liquid crystal element 113 and the capacitor 116 in the pixel 114. Specifically, in the case of the pixel 114 in FIG. 3B, when the off-state current of the transistor 115 is low, leakage of electric charge through the transistor 115 can be prevented. Thus, the potential of an image signal that is applied to the liquid crystal element 113 and the capacitor 116 can be held more reliably. Accordingly, the change in the transmittance of the liquid crystal element 113 due to leakage of electric charge in one frame period is prevented, so that the quality of an image to be displayed can be improved. In addition, when the off-state current of the transistor 115 is low, leakage of electric charge through the transistor 115 can be prevented; thus, the area of the capacitor 116 can be made small. Consequently, the transmittance of the liquid crystal display device is increased, so that loss of light in the panel and power consumption can be reduced.

Next, an operation example of the light supply portion 106 in the liquid crystal display device 100 in FIG. 2 is described.

The liquid crystal display device 100 according to one embodiment of the present invention is driven so that one full-color image is displayed on the pixel portion 110 in a plurality of frame periods. The light supply portion 106 switches the hue of light supplied to the pixel portion 110 every frame period. In other words, lights corresponding to a plurality of hues are sequentially supplied to pixel portion 110 to synchronize with input of the image signals to the pixel portion 110.

Figure 5:
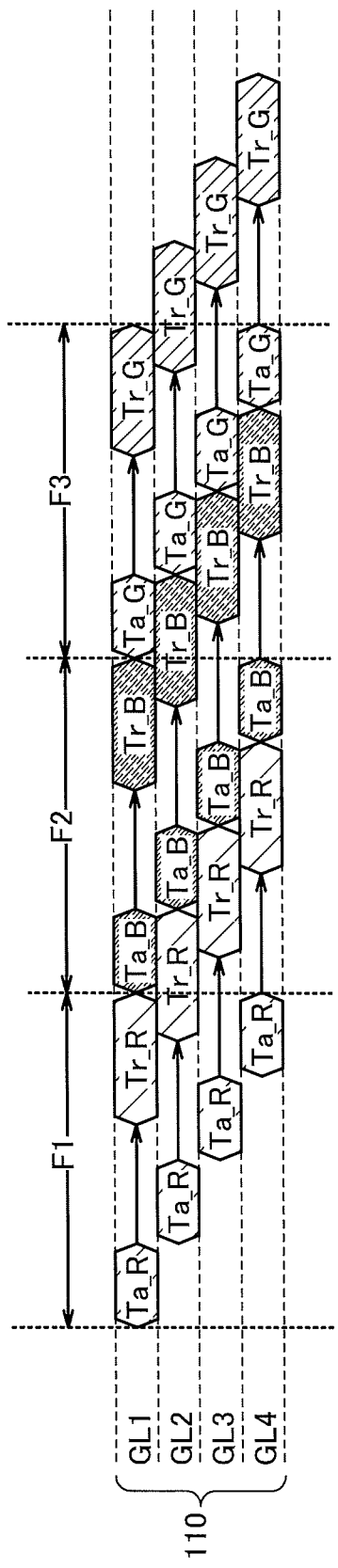
FIG. 5 is a diagram showing timing of inputting an image signal and timing of supplying light from a light supply portion.

FIG. 5 illustrates timing of inputting image signals to the pixel portion 110 and timing of inputting light from the light supply portion 106. In FIG. 5, the horizontal direction represents time, while the vertical direction represents the positions of the scan lines in the pixel portion 110. Note that FIG. 5 illustrates the case where the scan lines in the pixel portion 110 are divided into four groups. In other words, in FIG. 5, the scan lines G1 to Gy are divided into four groups GL1 to GL4.

First, in a first frame period F1 in FIG. 5, image signals corresponding to red are sequentially input to the pixels 114 connected to the scan lines G that belong to the group GL1. After the image signals corresponding to red are input to all the pixels 114 connected to the scan lines that belong to the group GL1, red light is supplied from the light supply portion 106 to the pixels 114. In FIG. 5, a period during which image signals corresponding to red are input to the pixels 114 is represented as a write period Ta_R, and a period during which red light is supplied from the light supply portion 106 to the pixels 114 is represented as a display period Tr_R. Note that supply of light to the pixels 114 connected to the scan lines that belong to the group GL1 can be done concurrently with supply of image signals to the pixels 114 connected to scan lines other than the scan lines that belong to the group GL1.

On the other hand, after image signals corresponding to red are input to all the pixels 114 connected to the scan lines G that belong to the group GL1, image signals corresponding to red are sequentially input to the pixels 114 connected to the scan lines G that belong to the group GL2. After the image signals corresponding to red are input to all the pixels 114 connected to the scan lines that belong to the group GL2, red light is supplied from the light supply portion 106 to the pixels 114. Supply of light to the pixels 114 connected to the scan lines that belong to the group GL2 can be done concurrently with supply of image signals to the pixels 114 connected to scan lines other than the scan lines that belong to the group GL2.

On the other hand, after image signals corresponding to red are input to all the pixels 114 connected to the scan lines G that belong to the group GL2, image signals corresponding to red are sequentially input to the pixels 114 connected to the scan lines G that belong to the group GL3. After the image signals corresponding to red are input to all the pixels 114 connected to the scan lines that belong to the group GL3, red light is supplied from the light supply portion 106 to the pixels 114. Supply of light to the pixels 114 connected to the scan lines that belong to the group GL3 can be done concurrently with supply of image signals to the pixels 114 connected to scan lines other than the scan lines that belong to the group GL3.

On the other hand, after image signals corresponding to red are input to all the pixels 114 connected to the scan lines G that belong to the group GL3, image signals corresponding to red are sequentially input to the pixels 114 connected to the scan lines G that belong to the group GL4. After the image signals corresponding to red are input to all the pixels 114 connected to the scan lines that belong to the group GL4, red light is supplied from the light supply portion 106 to the pixels 114. Supply of light to the pixels 114 connected to the scan lines that belong to the group GL4 can be done concurrently with supply of image signals to the pixels 114 connected to scan lines other than the scan lines that belong to the group GL4.

Note that FIG. 5 illustrates the case where after an image signal is input, light is supplied to the pixel 114 after the change in the alignment of liquid crystal molecules included in the liquid crystal layer due to the potential of the image signal is saturated. For this reason, for example, a predetermined period is placed from the end of the write period Ta_R to the start of the display period Tr_R. Such a predetermined period can be determined by the response speed of the liquid crystal.

In addition, in FIG. 5, lights are supplied to the pixels 114 sequentially from the group in which input of image signals is terminated. However, in one embodiment of the present invention, lights may be supplied to the pixels 114 after input of image signals to all the pixels 114 is terminated. Note that by sequentially starting supply of lights from the light supply portion at the time when input of image signals in each group is terminated, a long display period can be secured in each pixel or one frame period can be shortened compared to the case where supply of lights from the light supply portion is started at the time when input of image signals to all the pixels in the pixel portion is terminated. Further, in FIG. 5, the scan lines G are divided into four groups; however, the number of divisions of groups may be other than four.

Next, the same operation as that in the first frame period F1 is repeated in a second frame period F2 and a third frame period F3. Note that in the second frame period F2, image signals corresponding to blue and blue light are input to the pixels 114. In the third frame period F3, image signals corresponding to green and green light are input to the pixels 114. In FIG. 5, a period during which image signals corresponding to blue are input to the pixels 114 is represented as a write period Ta_B, and a period during which blue light is supplied from the light supply portion 106 to the pixels 114 is represented as a display period Tr_B. Further, in FIG. 5, a period during which image signals corresponding to green are input to the pixels 114 is represented as a write period Ta_G and a period during which green light is supplied from the light supply portion 106 to the pixels 114 is represented as a display period Tr_G.

After the first to third frame periods F1 to F3 are terminated, a full-color image can be displayed on the pixel portion 110.

In FIG. 5, in the write period, light is not supplied from the light supply portion 106 to the pixels 114. However, right after the write period is started, the change in the alignment of the liquid crystal molecules in the liquid crystal layer is small. For this reason, during a period from the start of the write period to the time when the observer perceives the change in the alignment of the liquid crystal molecules, light from the light supply portion 106 may be supplied to the pixels 114. Note that the hue of the light supplied to the pixels 114 at the beginning of the write period is the same as the hue of the light used in the display period followed by the write period.

Figure 6:
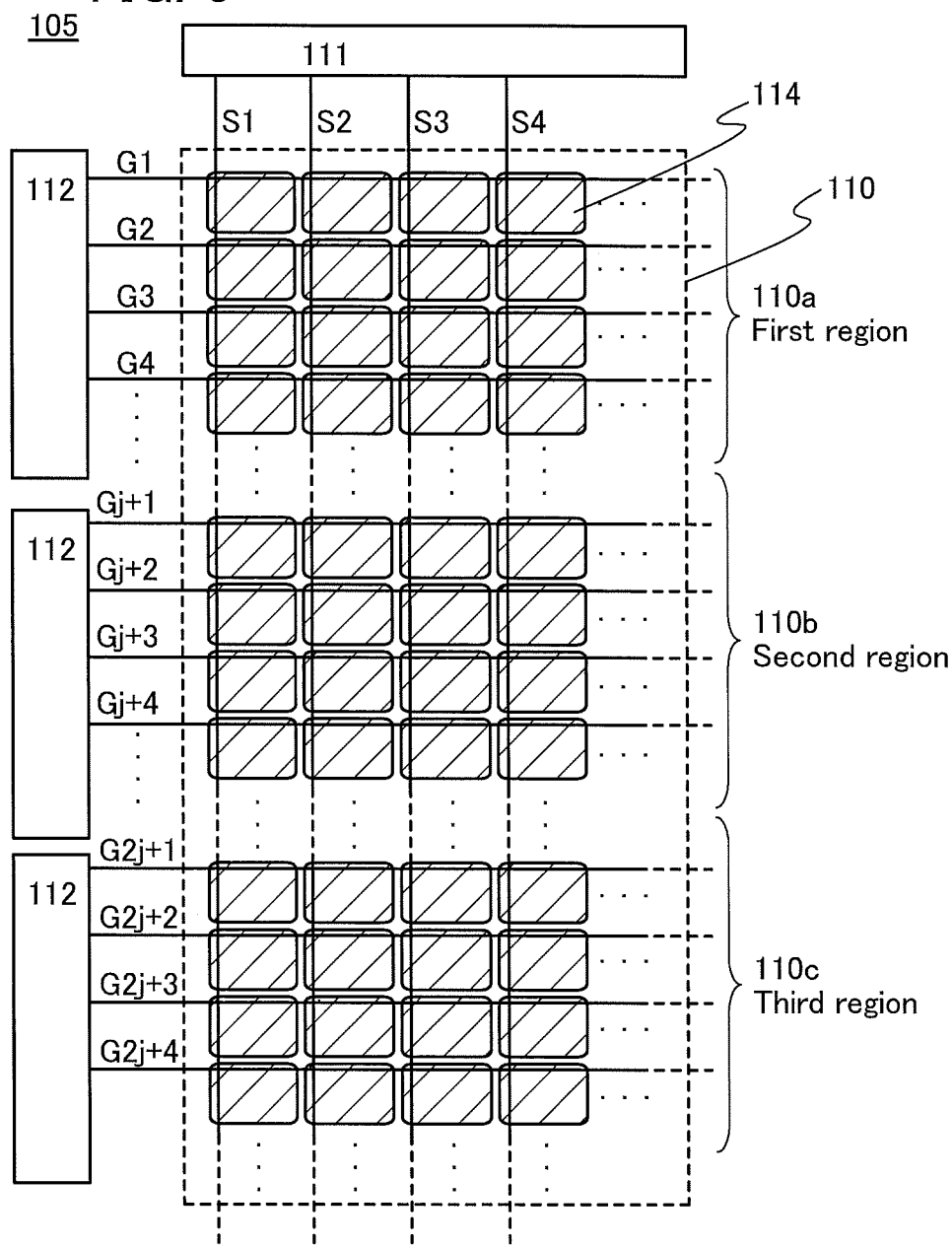
FIG. 6 illustrates a structure of the panel.

Next, FIG. 6 illustrates a structure example of the panel 105 that is different from the structure example in FIG. 3A.

Like the panel 105 in FIG. 3A, in the panel 105 in FIG. 6, the plurality of pixels 114, the plurality of scan lines G for selecting the pixels 114 row by row, and the plurality of signal lines S for supplying image signals to the selected pixels 114 are provided in the pixel portion 110. Input of signals to the scan lines G is controlled by the scan line driver circuit 112. Input of image signals to the signal lines S is controlled by the signal line driver circuit 111.

Note that in the panel 105 in FIG. 6, the pixel portion 110 is divided into a first region 110a, a second region 110b, and a third region 110c. The pixels 114 in the first region 110a, the second region 110b, and the third region 110c are each electrically connected to at least one of the signal lines S1 to Sx. Each pixel 114 in the first region 110a is connected to at least one of scan lines G1 to Gj among the scan lines G1 to Gy. Each pixel 114 in the second region 110b is connected to at least one of scan lines Gj+1 to G2j among the scan lines G1 to Gy. Each pixel 114 in the third region 110c is connected to at least one of scan lines G2j+1 to Gy (G3j) among the scan lines G1 to Gy.

Note that supply of image signals to the signal lines S is controlled by the signal line driver circuit 111, and the potentials of the scan lines G are controlled by the scan line driver circuit 112. FIG. 6 illustrates the case where three scan line driver circuits 112 control the potentials of the scan lines G1 to Gj in the first region 110a, the potentials of the scan lines Gj+1 to G2j in the second region 110b, and the potentials of the scan lines G2j+1 to Gy in the third region 110c, respectively. However, one embodiment of the present invention is not limited to this structure; one scan line driver circuit 112 may control the potentials of the scan lines G in all the regions.

Further, in the panel 105 in FIG. 6, the pixel 114 can have the structure in FIG. 3B.

Next, an operation example of the pixel portion 110 in FIG. 6 is described giving an example in which the pixel 114 has the structure in FIG. 3B.

First, in the first frame period, the scan line G1 is selected, so that the transistor 115 is turned on in each of the plurality of pixels 114 connected to the selected scan line G1. When the transistors 115 are on, image signals having a positive polarity are input to the signal lines S1 to Sx. Electric charge is accumulated in the capacitors 116 through the transistors 115 that are on in accordance with the potentials of the image signals applied to the signal lines S1 to Sx. Further, the potentials of the image signals are applied to the first electrodes of the liquid crystal elements 113 through the transistors 115 that are on.

In the liquid crystal element 113, the alignment of liquid crystal molecules is changed in accordance with the level of voltage across the first electrode and the second electrode, so that the transmittance is changed. Accordingly, when the transmittance of the liquid crystal element 113 is controlled by the potential of an image signal, gradation can be expressed.

When input of image signals to the signal lines S1 to Sx is completed, selection of the scan line G1 is terminated. When the selection of the scan line G1 is completed, the transistors 115 in the pixels 114 including the scan line G1 are turned off. Then, the voltage across the first electrode and the second electrode is held in the liquid crystal element 113, so that expression of gradation is maintained.

Similarly, the scan lines G2 to Gy are sequentially selected, and the pixels 114 connected to the scan lines G2 to Gy are sequentially subjected to the same operation as that performed while the scan line G1 is selected. Through the above operations, an image can be displayed on each of the first region 110a, the second region 110b, and the third region 110c.

Note that in the panel 105 in FIG. 6, the scan lines G1 to Gy are not necessarily selected sequentially. For example, the scan lines G may be sequentially selected from a plurality of regions one by one. Specifically, for example, the scan line G1 in the first region 110a is selected to write image signals to the pixels 114. Then, the scan line Gj+1 in the second region 110b is selected to write image signals to the pixels 114. Then, the scan line G2j+1 in the third region 110c is selected to write image signals to the pixels 114. Subsequently, the scan line G2 in the first region 110a is selected to write image signals to the pixels 114. Then, the scan line Gj+2 in the second region 110b is selected to write image signals to the pixels 114. Next, the scan line G2j+2 in the third region 110c is selected to write image signals to the pixels 114. The repeat of these operations enables image signals to be written to all the pixels.

Next, in the second frame period, as in the first frame period, image signals are input to the pixels 114. Note that in the second frame period, as in the first frame period, in a period during which each scan line G is selected, image signals having a positive polarity are input to the signal lines S1 to Sx. In one embodiment of the present invention, when the polarities of image signals input to the pixels 114 are the same in consecutive frame periods, image signals can be input to the pixel portion at high speed compared to the case where the polarities of image signals input to the pixels 114 are inverted every frame period.

Next, an operation example of the light supply portion 106 in the liquid crystal display device 100 in FIG. 2 that includes the panel 105 in FIG. 6 is described.

Figure 7:
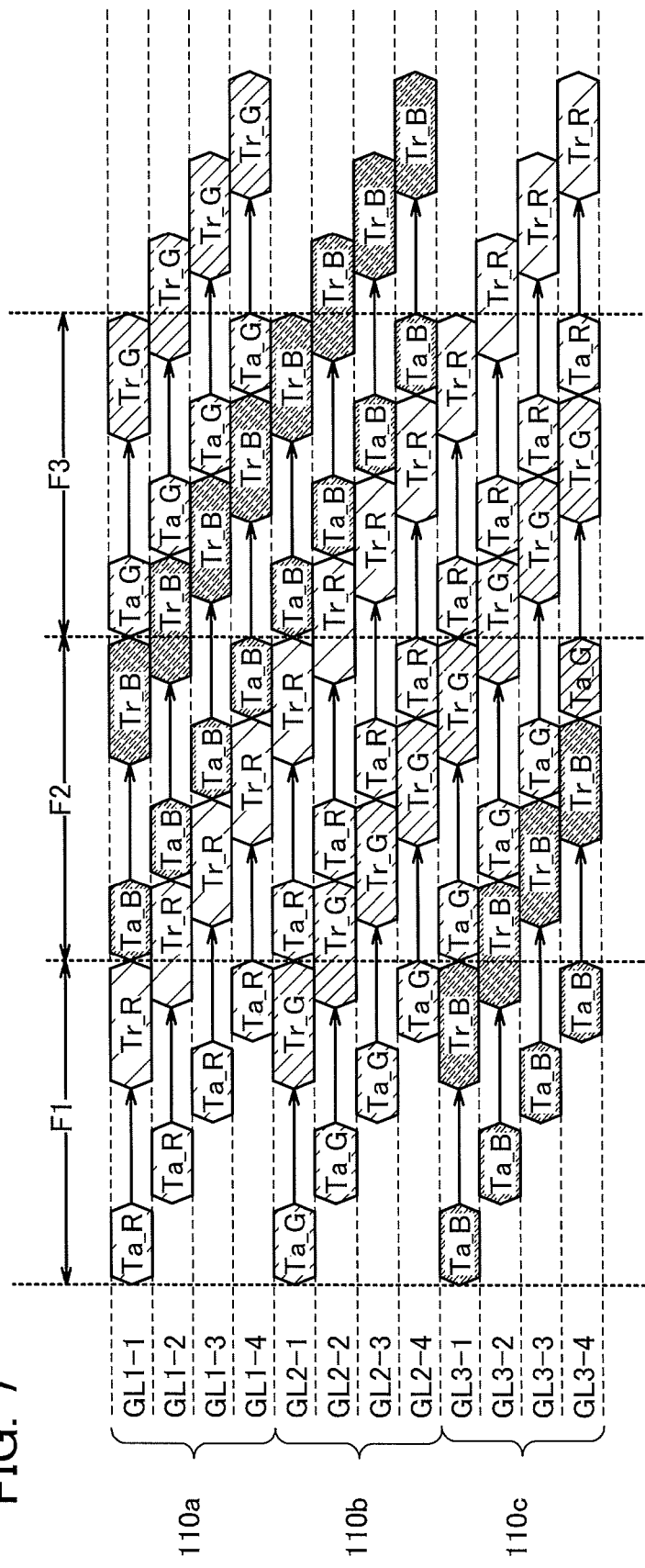
FIG. 7 is a diagram showing timing of inputting an image signal and timing of supplying light from the light supply portion.

FIG. 7 illustrates timing of writing image signals to the pixel portion 110 and timing of supplying light from the light supply portion 106. In FIG. 7, the horizontal direction represents time, while the vertical direction represents the positions of the scan lines G in the first region 110a, the second region 110b, and the third region 110c. Note that FIG. 7 illustrates the case where the scan lines G in each region are divided into four groups. In other words, the scan lines G1 to Gj in the first region 110a are divided into four groups GL1-1 to GL1-4; the scan lines Gj+1 to G2j in the second region 110b are divided into four groups GL2-1 to GL2-4; and the scan lines G2j+1 to G3j in the third region 110c are divided into four groups GL3-1 to GL3-4.

First, in the first frame period F1, image signals corresponding to red are written to the first region 110a, image signals corresponding to green are written to the second region 110b, and image signals corresponding to blue are written to the third region 110c.

Specifically, in the first frame period F1 in FIG. 7, image signals corresponding to red are input to the pixels 114 connected to the scan line G1 that belongs to the group GL1-1. Then, image signals corresponding to green are input to the pixels 114 connected to the scan line Gj+1 that belongs to the group GL2-1. After that, image signals corresponding to blue are input to the pixels 114 connected to the scan line G2j+1 that belongs to the group GL3-1.

Then, image signals corresponding to red are input to the pixels 114 connected to the scan line G2 that belongs to the group GL1-1.

Then, the pixels 114 connected to the scan lines G that belong to the group GL1-1, the pixels 114 connected to the scan lines G that belong to the group GL2-1, and the pixels 114 connected to the scan lines G that belong to the group GL3-1 are sequentially subjected to the same operation.

After image signals corresponding to red are input to all the pixels 114 connected to the scan lines G that belong to the group GL1-1, image signals corresponding to red are sequentially input to all the pixels 114 connected to the scan lines G that belong to the next group GL1-2, as in the case of the group GL1-1. After image signals corresponding to green are input to all the pixels 114 connected to the scan lines G that belong to the group GL2-1, image signals corresponding to green are sequentially input to all the pixels 114 connected to the scan lines G that belong to the next group GL2-2, as in the case of the group GL2-1. After image signals corresponding to blue are input to all the pixels 114 connected to the scan lines G that belong to the group GL3-1, image signals corresponding to blue are sequentially input to all the pixels 114 connected to the scan lines G that belong to the next group GL3-2, as in the case of the group GL3-1.

In the first frame period F1, by the repeat of these operations, image signals corresponding to red are eventually input to all the pixels 114 in the first region 110a. In addition, image signals corresponding to green are input to all the pixels 114 in the second region 110b. Further, image signals corresponding to blue are input to all the pixels 114 in the third region 110c.

On the other hand, after the image signals corresponding to red are input to all the pixels 114 connected to the scan lines G that belong to the group GL1-1, red light is supplied from the light supply portion 106 to the pixels 114. In FIG. 7, a period during which image signals corresponding to red are input to the pixels 114 is represented as the write period Ta_R, and a period during which red light is supplied from the light supply portion 106 to the pixels 114 is represented as the display period Tr_R. Note that supply of light to the pixels 114 connected to the scan lines G that belong to the group GL1-1 can be done concurrently with supply of image signals to the pixels 114 connected to scan lines other than the scan lines G that belong to the group GL1-1.

Similarly, after the image signals corresponding to green are input to all the pixels 114 connected to the scan lines G that belong to the group GL2-1, green light is supplied from the light supply portion 106 to the pixels 114. In FIG. 7, a period during which image signals corresponding to green are input to the pixels 114 is represented as the write period Ta_G and a period during which green light is supplied from the light supply portion 106 to the pixels 114 is represented as the display period Tr_G. Supply of light to the pixels 114 connected to the scan lines G that belong to the group GL2-1 can be done concurrently with supply of image signals to the pixels 114 connected to scan lines other than the scan lines G that belong to the group GL2-1.

Similarly, after the image signals corresponding to blue are input to all the pixels 114 connected to the scan lines G that belong to the group GL3-1, blue light is supplied from the light supply portion 106 to the pixels 114. In FIG. 7, a period during which image signals corresponding to blue are input to the pixels 114 is represented as the write period Ta_B, and a period during which blue light is supplied from the light supply portion 106 to the pixels 114 is represented as the display period Tr_B. Supply of light to the pixels 114 connected to the scan lines G that belong to the group GL3-1 can be done concurrently with supply of image signals to the pixels 114 connected to scan lines other than the scan lines G that belong to the group GL3-1.

Then, as in the case of the group GL1-1, red lights are sequentially supplied from the light supply portion 106 to all the pixels 114 connected to the scan lines G that belong to the groups GL1-2 to GL1-4. Consequently, part of an image corresponding to red is eventually displayed on the first region 110a in the first frame period F1. Then, as in the case of the group GL2-1, green lights are sequentially supplied from the light supply portion 106 to all the pixels 114 connected to the scan lines G that belong to the groups GL2-2 to GL2-4. Consequently, part of an image corresponding to green is eventually displayed on the second region 110b in the first frame period F1. Then, as in the case of the group GL3-1, blue lights are sequentially supplied from the light supply portion 106 to all the pixels 114 connected to the scan lines G that belong to the groups GL3-2 to GL3-4. Consequently, part of an image corresponding to blue is eventually displayed on the third region 110c in the first frame period F1.

Note that FIG. 7 illustrates the case where after an image signal is input, light is supplied to the pixel 114 after the change in the alignment of liquid crystal molecules included in the liquid crystal layer due to the potential of the image signal is saturated. For this reason, for example, a predetermined period is placed from the end of the write period Ta_R to the start of the display period Tr_R. Such a predetermined period can be determined by the response speed of the liquid crystal.

In FIG. 7, the scan lines G are sequentially selected from the plurality of regions one by one, and image signals are input to the pixels connected to the selected scan lines G. However, in one embodiment of the present invention, the scan lines 01 to Gy may be sequentially selected, and image signals may be input to the pixels connected to the selected scan lines G.

The same operation as that in the first frame period F1 is repeated in the second frame period F2 and the third frame period F3. Note that in the second frame period F2, image signals corresponding to blue and blue light are supplied to the first region 110a, image signals corresponding to red and red light are supplied to the second region 110b, and image signals corresponding to green and green light are supplied to the third region 110c. In the third frame period F3, image signals corresponding to green and green light are supplied to the first region 110a, image signals corresponding to blue and blue light are supplied to the second region 110b, and image signals corresponding to red and red light are supplied to the third region 110c.

Then, in all the first region 110a, the second region 110b, and the third region 110c, the first to third frame periods F1 to F3 are terminated and lights are supplied to all the pixels in each region; thus, a full-color image can be displayed on the pixel portion 110.

Note that FIG. 7 illustrates a timing chart of dot sequential driving in which image signals are sequentially input from the signal line driver circuit 111 to the signal lines S1 to Sx. However, the liquid crystal display device according to one embodiment of the present invention may employ line sequential driving in which image signals are concurrently input from the signal line driver circuit 111 to the signal lines S1 to Sx. Alternatively, the liquid crystal display device according to one embodiment of the present invention may employ a driving method in which image signals are sequentially input every plural signal lines S.

FIG. 7 illustrates the case where the scan lines G in each region are divided into four groups. However, the scan lines G in each region are not necessarily divided into four groups. The number of divisions may be other than four, or the scan lines G in each region is even not divided.

In FIG. 7, after the supply of image signals to one group is terminated, the supply of light from the light supply portion is started. This can extend the display period or shorten one frame period compared to starting the supply of light from the light supply portion after the supply of image signals to all the pixels in the pixel portion is terminated.

In FIG. 7, in the write period, light is not supplied from the light supply portion 106 to the pixels 114. However, right after the write period is started, the change in the alignment of the liquid crystal molecules in the liquid crystal layer is small. For this reason, during a period from the start of the write period to the time when the observer perceives the change in the alignment of the liquid crystal molecules, light from the light supply portion 106 may be supplied to the pixels 114. Note that the hue of the light supplied to the pixels 114 at the beginning of the write period is the same as the hue of the light used in the display period followed by the write period.

In the liquid crystal display device in FIG. 6 and FIG. 7 according to one embodiment of the present invention, a pixel portion is divided into a plurality of regions, and lights of different hues are sequentially supplied to the regions; thus, a full-color image is displayed. Accordingly, at a given time, the hues of lights supplied to adjacent regions can be different from each other. Consequently, it is possible to prevent generation of color breakup, unlike in the case of FIG. 5. The liquid crystal display device according to one embodiment of the present invention does not require a color filter, and thus can have high use efficiency of light emitted from the light supply portion and consume less power.

Embodiment 2

In this embodiment, the structure of a driver circuit in a liquid crystal display device according to one embodiment of the present invention is described.

Figure 8:
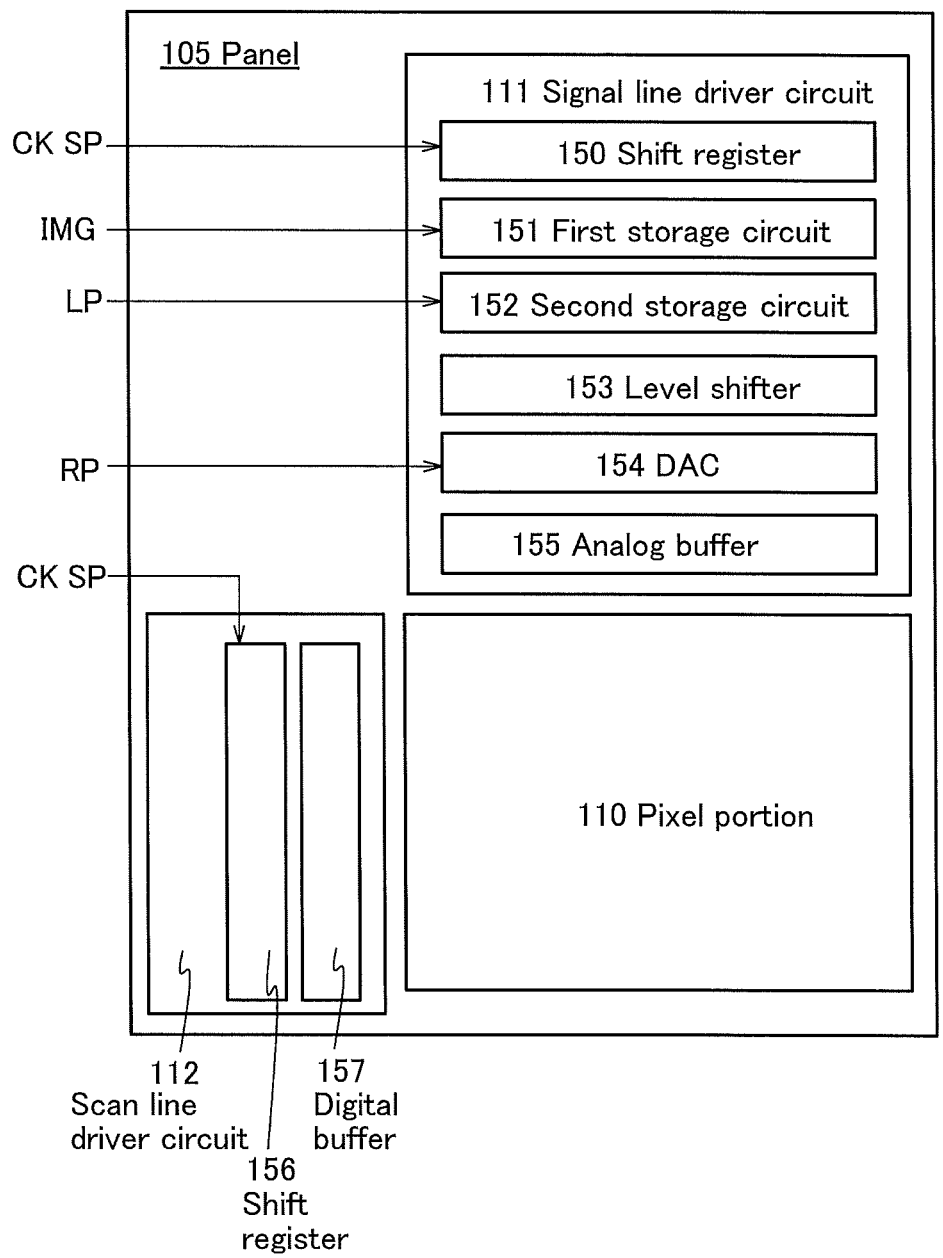
FIG. 8 is a block diagram of the panel.

FIG. 8 is an example of a block diagram illustrating the structure of the panel 105 in FIG. 2. The panel 105 in FIG. 8 includes the pixel portion 110, the signal line driver circuit 111, and the scan line driver circuit 112. The signal line driver circuit 111 includes a shift register 150, a first storage circuit 151, a second storage circuit 152, a level shifter 153, a DA converter (DAC) 154, and an analog buffer 155. The scan line driver circuit 112 includes a shift register 156 and a digital buffer 157.

Next, the operation of the panel 105 in FIG. 8 is described. When a start pulse signal SP and a clock signal CK for the signal line driver circuit 111 are input to the shift register 150, the shift register 150 generates timing signals whose pulses are sequentially shifted.

Image signals IMG are input to the first storage circuit 151. When the timing signals are input to the first storage circuit 151, the image signals IMG are sampled in response to the pulses of the timing signals to be sequentially written to a plurality of memory elements included in the first storage circuit 151. The image signals IMG written to the first storage circuit 151 are held.

Note that either one of the following methods may be employed: a method in which the image signals IMG are sequentially written to the plurality of memory elements included in the first storage circuit 151; and division driving in which the plurality of memory elements included in the first storage circuit 151 are divided into several groups and the image signals IMG are input to the groups in parallel. Note that the number of memory elements included in each group in that case is referred to as the number of divisions. For example, in the case where a storage circuit is divided into groups such that each group has four memory elements, division driving is performed with four divisions.

The latch signal LP is input to the second storage circuit 152. After writing of the image signals IMG to the first storage circuit 151 is completed, the image signals IMG held in the first storage circuit 151 are written to and held in the second storage circuit 152 all at once in response to the pulse of the latch signal LP input to the second storage circuit 152 in a retrace period. After the first storage circuit 151 transmits the image signals IMG to the second storage circuit 152, the next image signals IMG are sequentially written to the first storage circuit 151 in response to the timing signals from the shift register 150. In a second round of one line period, the image signals IMG that are written to and held in the second storage circuit 152 are transmitted to the DAC 154 after the amplitude of the voltage is adjusted in the level shifter 153.

A signal RP controlling inversion of the polarity of the image signal IMG is input from the controller to the DAC 154. The DAC 154 converts a digital image signal IMG input from the level shifter 153 into an analog image signal IMG having a positive or negative polarity in response to the signal RP. Then, the image signal IMG that is converted into an analog signal is transmitted to the analog buffer 155. The image signal IMG transmitted from the DAC 154 is transmitted from the analog buffer 155 to the pixel portion 110 through a signal line.

In contrast, in the scan line driver circuit 112, when a start signal SP and a clock signal CK for the scan line driver circuit 112 are input to the shift register 156, scan signals SCN whose pulses are sequentially shifted are generated. The scan signal SCN output from the shift register 150 is transmitted from the digital buffer 157 to the pixel portion 110 through a scan line.

The pixel included in the pixel portion 110 is selected by the scan signal SCN input from the scan line driver circuit 112 to the scan line. The image signal IMG transmitted from the signal line driver circuit 111 to the pixel portion 110 through the signal line is input to the selected pixel.

Note that in FIG. 8, the polarity of an image signal is inverted in the panel 105 in accordance with an instruction from the controller 103. However, the polarity of an image signal may be inverted in the controller 103. In that case, an analog image signal having a positive polarity and an analog image signal having a negative polarity are input from the controller to the signal line driver circuit.

This embodiment can be combined with any of the other embodiments as appropriate.

Embodiment 3

In a liquid crystal display device according to one embodiment of the present invention, a transistor may include a channel formation region in a semiconductor film of amorphous, microcrystalline, polycrystalline, or single crystal silicon, germanium, or the like. Alternatively, the transistor may include a channel formation region in a semiconductor film whose bandgap is wider than that of silicon and whose intrinsic carrier density is lower than that of silicon. Any of the following can be used as silicon: amorphous silicon formed by sputtering or vapor deposition such as plasma-enhanced CVD; polycrystalline silicon obtained in such a manner that amorphous silicon is crystallized by laser annealing or the like; single crystal silicon obtained in such a manner that a surface portion of a single crystal silicon wafer is separated by implantation of hydrogen ions or the like into the silicon wafer; and the like.

A highly-purified oxide semiconductor (a purified oxide semiconductor) obtained by reduction of impurities such as moisture or hydrogen that serve as electron donors (donors) and reduction of oxygen vacancies is an intrinsic (i-type) semiconductor or a substantially intrinsic semiconductor. Thus, a transistor including a channel formation region in a highly-purified oxide semiconductor film has extremely low off-state current and high reliability.

Specifically, various experiments can prove low off-state current of a transistor including a channel formation region in a highly-purified oxide semiconductor film. For example, even when an element has a channel width of $1\times10^6$ μm and a channel length of 10 μm, off-state current can be lower than or equal to the measurement limit of a semiconductor parameter analyzer, i.e., lower than or equal to $1\times10^{-13}$ A, at a voltage (drain voltage) across a source and a drain of 1 to 10 V. In that case, it can be seen that off-state current normalized on the channel width of the transistor is lower than or equal to 100 zA/μm. In addition, a capacitor and a transistor were connected to each other and off-state current was measured using a circuit in which electric charge flowing to or from the capacitor is controlled by the transistor. In the measurement, a highly-purified oxide semiconductor film was used in the channel formation region of the transistor, and the off-state current of the transistor was measured from a change in the amount of electric charge of the capacitor per unit hour. As a result, it can be seen that, in the case where the voltage across a source electrode and a drain electrode of the transistor is 3 V, a lower off-state current of several tens of yoctoamperes per micrometer is obtained. Accordingly, the transistor including the highly-purified oxide semiconductor film in the channel formation region has much lower off-state current than a crystalline silicon transistor.

Note that unless otherwise specified, in this specification, off-state current of an n-channel transistor is current that flows between a source and a drain when the potential of the drain is higher than that of the source or that of a gate while the potential of the gate is 0 V or lower in the case of the potential of the source used as a reference. Alternatively, in this specification, off-state current of a p-channel transistor is current that flows between a source and a drain when the potential of the drain is lower than that of the source or that of a gate while the potential of the gate is 0 V or higher in the case of the potential of the source used as a reference.

Next, examples of a transistor including a channel formation region in an oxide semiconductor film are described with reference to drawings.

Figure 9A:
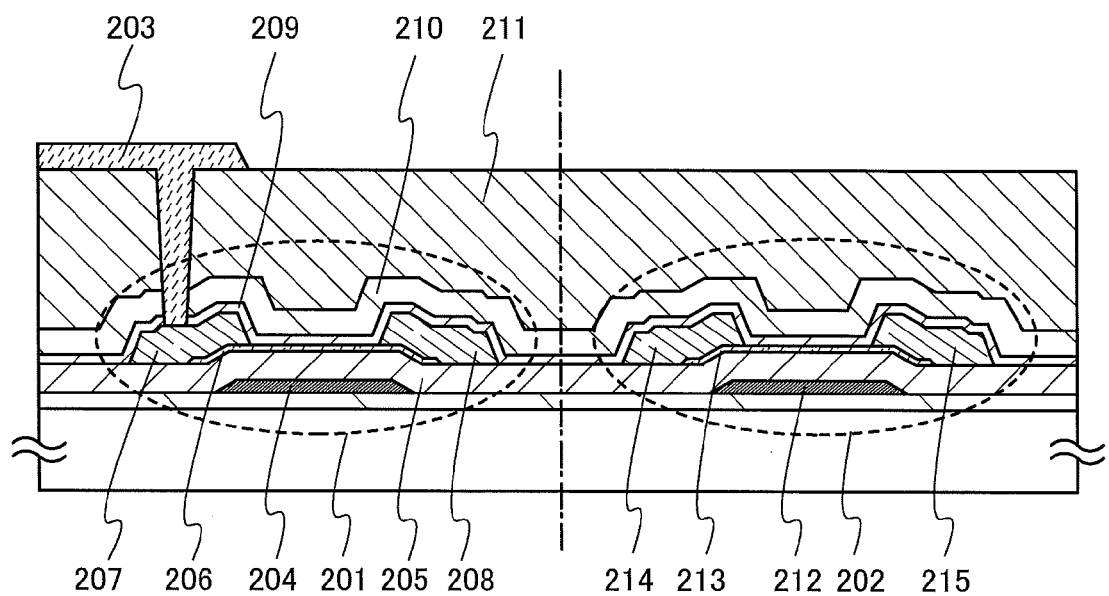
FIGS. 9A and 9B each illustrate a cross-sectional structure of a liquid crystal display device.

FIG. 9A illustrates an example of a cross-sectional structure of a transistor 201 provided in a pixel and a transistor 202 provided in a driver circuit.

The transistor 201 in FIG. 9A includes a conductive film 204 that is provided over an insulating surface and functions as a gate, an insulating film 205 over the conductive film 204, a semiconductor film 206 that overlaps with the conductive film 204 over the insulating film 205, and conductive films 207 and 208 that are provided over the semiconductor film 206 and function as a source and a drain. In FIG. 9A, insulating films 209 and 210 are sequentially stacked over the semiconductor film 206 and the conductive films 207 and 208. The transistor 201 may include the insulating films 209 and 210.

An insulating film 211 formed using a resin is provided over the insulating films 209 and 210. An opening is provided in the insulating films 209, 210, and 211, and the conductive film 203 that is connected to the conductive film 207 through the opening is provided over the insulating film 211. The conductive film 203 functions as a first electrode of a liquid crystal element.

For example, the liquid crystal element includes the first electrode, a second electrode, and a liquid crystal layer to which an electric field is applied by the first electrode and the second electrode. Thus, in the case where the liquid crystal element is formed over the transistor 201, in addition to the conductive film 203, the liquid crystal layer and a conductive film functioning as the second electrode may be provided over the insulating film 211.

The use of a resin for the insulating film 211 can prevent generation of unevenness on a surface where the conductive film 203 is formed, that is, can increase the flatness of the surface where the conductive film 203 is formed.

Specifically, an organic material such as an acrylic resin, an epoxy resin, a benzocyclobutene-based resin, polyimide, or polyamide can be used for the insulating film 211. As an alternative to the organic material, it is possible to use a silicone resin or the like. Note that the insulating film 211 having higher flatness can be formed by stacking a plurality of insulating films formed using these materials.

Specifically, for the conductive film 203, any of indium oxide, indium oxide-tin oxide (indium tin oxide (ITO)), indium oxide-tin oxide containing silicon or silicon oxide, indium oxide-zinc oxide (indium zinc oxide), indium oxide containing tungsten oxide and zinc oxide, an Al—Zn-based oxide semiconductor containing nitrogen, a Zn-based oxide semiconductor containing nitrogen, a Sn—Zn-based oxide semiconductor containing nitrogen, gold (Au), platinum (Pt), nickel (Ni), tungsten (W), chromium (Cr), molybdenum (Mo), iron (Fe), cobalt (Co), copper (Cu), palladium (Pd), and titanium (Ti) can be used. Other examples are elements that belong to Group 1 or 2 in the periodic table, for example, an alkali metal such as lithium (Li) or cesium (Cs) and an alkaline earth metal such as magnesium (Mg), calcium (Ca), or strontium (Sr), an alloy containing such an element (e.g., MgAg or AlLi), a rare earth metal such as europium (Eu) or ytterbium (Yb), and an alloy containing such an element. Note that the conductive film 203 can be formed in such a manner that, for example, a conductive film is formed using the above material by sputtering or vapor deposition (including vacuum vapor deposition), and then the conductive film is processed into a desired shape by etching through a photolithography process.

The transistor 202 in FIG. 9A includes a conductive film 212 that is provided over an insulating surface and functions as a gate, the insulating film 205 over the conductive film 212, a semiconductor film 213 that overlaps with the conductive film 212 over the insulating film 205, and conductive films 214 and 215 that are provided over the semiconductor film 213 and function as a source and a drain. In FIG. 9A, the insulating films 209 and 210 are sequentially stacked over the semiconductor film 213 and the conductive films 214 and 215. The insulating film 211 formed using a resin is provided over the insulating films 209 and 210.

Note that in FIG. 9A, a conductive film functioning as a back gate of the transistor 202 included in the driver circuit may be formed over the insulating film 211 together with the conductive film 203 functioning as the electrode of the liquid crystal element in the pixel. With such a structure, the conductive film 203 and the conductive film functioning as a back gate can be formed by processing one conductive film into a desired shape by etching or the like. Accordingly, the conductive film functioning as a back gate can be formed without an increase in steps of manufacturing a liquid crystal display device.

The back gate may be floating or may be supplied with a potential from another element. In the latter case, potentials at the same level may be applied to a normal gate (a front gate) and the back gate, or a fixed potential such as a ground potential may be applied only to the back gate. By controlling the potential applied to the back gate, the threshold voltage of the transistor 202 can be controlled. By providing the back gate, a channel formation region is enlarged and drain current can be increased. Further, provision of the back gate facilitates formation of a depletion layer in the semiconductor film, which results in lower subthreshold swing.

In FIG. 9A, the insulating films 209 and 210 are provided between the semiconductor films 206 and 213 and the insulating film 211. However, the number of insulating films provided between the semiconductor films 206 and 213 and the insulating film 211 may be one, or may be three or more.

The insulating film 210 preferably contains oxygen at a proportion higher than or equal to the stoichiometric composition and has a function of supplying part of oxygen to the semiconductor film 206 by heating. In addition, the insulating film 210 preferably has a few defects, typically, the spin density derived from a signal that appears at g=2.001 due to a dangling bond of silicon is $1 \times 10^{18}$ spins/cm$^3$ or lower when measured by ESR. Note that in the case where the semiconductor film 206 is damaged at the time of formation of the insulating film 210 when the insulating film 210 is directly formed on the semiconductor films 206 and 213, the insulating film 209 is preferably provided between the semiconductor films 206 and 213 and the insulating film 210, as illustrated in FIG. 9A. The insulating film 209 preferably causes little damage to the semiconductor film 206 when the insulating film 209 is formed compared to the case of the insulating film 210 and has a function of passing oxygen. If damage to the semiconductor films 206 and 213 can be reduced and the insulating film 210 can be formed directly on the semiconductor films 206 and 213, the insulating film 209 is not necessarily provided.

The insulating film 209 preferably has a few defects, typically, the spin density derived from a signal that appears at g=2.001 due to a dangling bond of silicon is $3 \times 10^{17}$ spins/cm$^3$ or lower when measured by ESR. This is because if the density of defects in the insulating film 209 is high, oxygen is bonded to the defects and the amount of oxygen that passes through the insulating film 209 is decreased.

Further, an interface between the insulating film 209 and the semiconductor films 206 and 213 preferably has a few defects, typically, the spin density of a signal that appears at g=1.93 due to oxygen vacancies in an oxide semiconductor used for the semiconductor films 206 and 213 is lower than or equal to $1 \times 10^{17}$ spins/cm$^3$, preferably lower than or equal to the measurement limit when measured by ESR where a magnetic field is applied parallel to a film surface.

Specifically, a silicon oxide film or a silicon oxynitride film can be used as the insulating film 209 or 210.

Figure 9B:
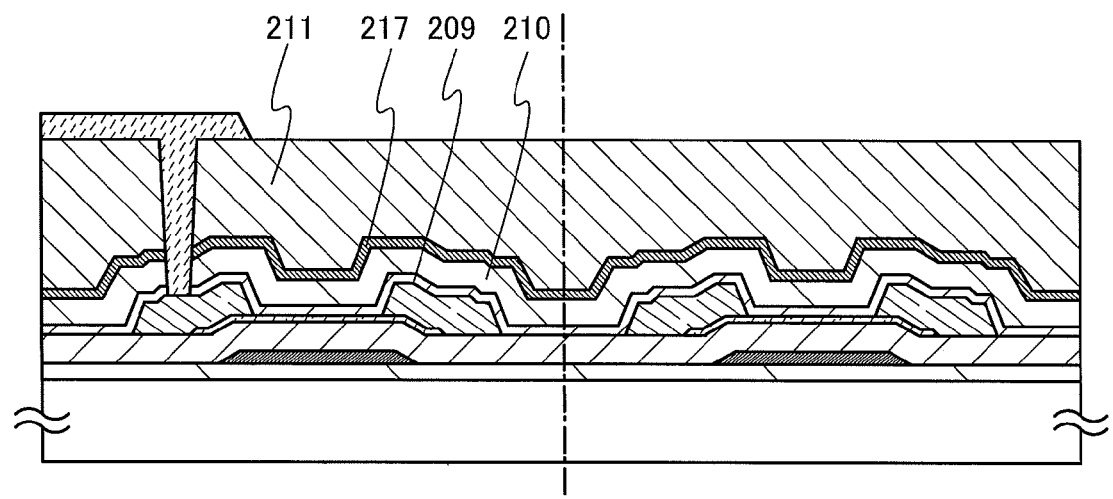

Next, FIG. 9B illustrates a cross-sectional structure of the transistor 201, the conductive film 203 connected to the transistor 201, and the transistor 202 where an insulating film 217 is further provided between the insulating films 210 and 211 in the cross-sectional structure in FIG. 9A. The insulating film 217 preferably has an effect of blocking diffusion of oxygen, hydrogen, and water. Alternatively, the insulating film 217 preferably has an effect of blocking diffusion of hydrogen and water.

As an insulating film has higher density and becomes denser or has a fewer dangling bonds and becomes more chemically stable, the insulating film has a higher blocking effect. An insulating film that has an effect of blocking diffusion of oxygen, hydrogen, and water can be formed using, for example, aluminum oxide, aluminum oxynitride, gallium oxide, gallium oxynitride, yttrium oxide, yttrium oxynitride, hafnium oxide, or hafnium oxynitride. An insulating film that has an effect of blocking diffusion of hydrogen and water can be formed using, for example, silicon nitride or silicon nitride oxide.

In the case where the insulating film 217 has an effect of blocking diffusion of water, hydrogen, and the like, impurities such as water and hydrogen that exist in the insulating film 211 formed using a resin or exist outside the panel can be prevented from entering the semiconductor film 206 or 213. In the case where an oxide semiconductor is used for the semiconductor film 206 or 213, part of water or hydrogen entering the oxide semiconductor serves as an electron donor (donor). Thus, the use of the insulating film 217 having the blocking effect can prevent shifts in threshold voltages of the transistors 201 and 202 due to generation of donors.

In addition, in the case where an oxide semiconductor is used for the semiconductor film 206 or 213, when the insulating film 217 has an effect of blocking diffusion of oxygen, diffusion of oxygen from the oxide semiconductor into the outside can be prevented. Accordingly, oxygen vacancies in the oxide semiconductor that serve as donors are reduced, so that shifts in threshold voltages of the transistors 201 and 202 due to generation of donors can be prevented.

In the case where adhesion of the insulating films 217 and 211 is higher than that of the insulating films 210 and 211, the use of the insulating film 217 can prevent separation of the insulating film 211.

In the case where an oxide semiconductor film is used as each of the semiconductor films 206 and 213, an oxide semiconductor preferably contains at least indium (In) or zinc (Zn). As a stabilizer for reducing variations in electrical characteristics of a transistor including the oxide semiconductor, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

Among the oxide semiconductors, unlike silicon carbide, gallium nitride, or gallium oxide, an In—Ga—Zn-based oxide, an In—Sn—Zn-based oxide, or the like has an advantage of high mass productivity because a transistor with favorable electrical characteristics can be formed by sputtering or a wet process. Further, unlike silicon carbide, gallium nitride, or gallium oxide, with the use of the In—Ga—Zn-based oxide, a transistor with favorable electrical characteristics can be formed over a glass substrate. Furthermore, a larger substrate can be used.

As another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For example, indium oxide; gallium oxide; tin oxide; zinc oxide; a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used as an oxide semiconductor.

Note that, for example, an In—Ga—Zn-based oxide means an oxide containing In, Ga, and Zn, and there is no limitation on the ratio of In, Ga, and Zn. In addition, the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Further, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide whose composition is in the neighborhood of the above composition can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide whose composition is in the neighborhood of the above composition is preferably used.

For example, with an In—Sn—Zn-based oxide, high mobility can be comparatively easily obtained. However, even with an In—Ga—Zn-based oxide, mobility can be increased by lowering defect density in a bulk.

The structure of an oxide semiconductor film is described below.

An oxide semiconductor film is roughly classified into a single-crystal oxide semiconductor film and a non-single-crystal oxide semiconductor film. The non-single-crystal oxide semiconductor film means any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example of the amorphous oxide semiconductor film is an oxide semiconductor film in which no crystal part exists even in a microscopic region, and the whole of the film is amorphous.

The microcrystalline oxide semiconductor film includes a microcrystal (also referred to as nanocrystal) of greater than or equal to 1 nm and less than 10 nm, for example. Thus, the microcrystalline oxide semiconductor film has higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit into a cube whose one side is less than 100 nm. Thus, there is a case where a crystal part included in the CAAC-OS film fits into a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

In this specification, the term "parallel" indicates that an angle formed between two straight lines is −10 to 10°, and accordingly includes the case where the angle is −5 to 5°. In addition, the term "perpendicular" indicates that an angle formed between two straight lines is 80 to 100°, and accordingly includes the case where the angle is 85 to 95°.

On the other hand, according to the TEM image of the CAAC-OS film observed in a direction substantially perpendicular to the sample surface (planar IBM image), metal atoms are arranged in a triangular or hexagonal configuration in the crystal parts. However, there is no regularity of arrangement of metal atoms between different crystal parts.

From the results of the cross-sectional TEM image and the planar TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer which is arranged in a layered manner and observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where the shape of the CAAC-OS film is changed by etching or the like, the c-axis might not be necessarily parallel to a normal vector of a formation surface or a normal vector of a top surface of the CAAC-OS film.

Further, the crystallinity in the CAAC-OS film is not necessarily uniform. For example, in the case where crystal growth leading to the CAAC-OS film occurs from the vicinity of the top surface of the film, the crystallinity in the vicinity of the top surface is higher than that in the vicinity of the formation surface in some cases. Further, when an impurity is added to the CAAC-OS film, the crystallinity in a region to which the impurity is added is changed, and the crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor including the CAAC-OS film, changes in electrical characteristics of the transistor due to irradiation with visible light or ultraviolet light are small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

For example, a CAAC-OS film is deposited by sputtering with a polycrystalline oxide semiconductor sputtering target. When ions collide with the sputtering target, a crystal region included in the sputtering target may be separated from the target along the a-b plane, and a sputtered particle having a plane parallel to the a-b plane (a flat-plate-like sputtered particle or a pellet-like sputtered particle) might be separated from the sputtering target. In that case, the flat-plate-like sputtered particle reaches a substrate while maintaining its crystal state, so that the CAAC-OS film can be deposited.

For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a deposition chamber may be reduced. Further, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle occurs after the sputtered particle reaches the substrate. Specifically, the substrate heating temperature during the deposition is 100 to 740° C., preferably 200 to 500° C. By increasing the substrate heating temperature during the deposition, when the flat-plate-like sputtered particle reaches the substrate, migration occurs on the substrate, so that a flat plane of the sputtered particle is attached to the substrate.

Further, it is preferable to reduce plasma damage during the deposition by increasing the proportion of oxygen in the deposition gas and optimizing power. The proportion of oxygen in the deposition gas is 30 vol % or higher, preferably 100 vol %.

As an example of the sputtering target, an In—Ga—Zn-based oxide target is described below.

A polycrystalline In—Ga—Zn-based oxide target is made by mixing $InO_X$ powder, $GaO_Y$ powder, and $ZnO_Z$ powder in a predetermined mole ratio, applying pressure, and performing heat treatment at 1000 to 1500° C. Note that X, Y, and Z are each a given positive number. Here, the predetermined mole ratio of the $InO_X$ powder, the $GaO_Y$ powder, and the $ZnO_Z$ powder is, for example, 2:2:1, 8:4:3, 3:1:1, 1:1:1, 4:2:3, or 3:1:2. The kinds of powder and the mole ratio for mixing powder may be changed as appropriate depending on a sputtering target to be formed.

Each of the semiconductor films 206 and 213 may be a stack of a plurality of oxide semiconductor films formed using metal oxide targets with different atomic ratios of metals. For example, each of the semiconductor films 206 and 213 may be formed in such a manner that a first oxide semiconductor film is formed using a target with an atomic ratio of In:Ga:Zn of 1:1:1 and a second oxide semiconductor film is formed using a target with an atomic ratio of In:Ga:Zn of 3:1:2. Alternatively, each of the semiconductor films 206 and 213 may be formed in such a manner that a first oxide semiconductor film, a second oxide semiconductor film, and a third oxide semiconductor film are formed with targets having atomic ratios of In:Ga:Zn of 1:3:2, 3:1:2, and 1:1:1, respectively.

Alternatively, each of the semiconductor films 206 and 213 may be a stack of a plurality of oxide semiconductor films formed using metal oxide targets containing different metals.

This embodiment can be combined with any of the other embodiments as appropriate.

Embodiment 4

In this embodiment, a specific structure example of the pixel 114 in a liquid crystal display device according to one embodiment of the present invention is described giving an example of the pixel 114 in FIG. 3B.

FIG. 10A illustrates an example of a top view of the pixel. Note that the top view in FIG. 10A does not illustrate insulating films, a liquid crystal layer, and a second electrode for clarity of the layout of the pixel 114. FIG. 10B is a cross-sectional view taken along broken lines A1-A2 and B1-B2 in FIG. 10A.

In the pixel in FIGS. 10A and 10B, a conductive film 501 functions as the scan line G or the gate of the transistor 115. A conductive film 502 functions as the signal line S or one of the source and the drain of the transistor 115. A conductive film 503 functions as one electrode of the capacitor 116. A conductive film 504 functions as the other of the source and the drain of the transistor 115 or the other electrode of the capacitor 116.

A gate insulating film 506 is formed over the conductive films 501 and 503. A semiconductor film 507 of the transistor 115 is formed over the gate insulating film 506 to overlap with the conductive film 501.

In the pixel in FIGS. 10A and 10B, the gate insulating film 506 and a semiconductor film 520 are provided in a portion where the conductive films 503 and 502 overlap with each other. Specifically, the gate insulating film 506 is provided over the conductive film 503. The semiconductor film 520 is provided over the gate insulating film 506. The conductive film 502 is provided over the semiconductor film 520. By providing the semiconductor film 520 between the conductive films 502 and 503, parasitic capacitance between the conductive films 502 and 503 can be reduced.

In the pixel in FIGS. 10A and 10B, the gate insulating film 506 and a semiconductor film 523 are provided in a portion where the conductive films 501 and 502 overlap with each other. Specifically, the gate insulating film 506 is provided over the conductive film 501. The semiconductor film 523 is provided over the gate insulating film 506. The conductive film 502 is provided over the semiconductor film 523. By providing the semiconductor film 523 between the conductive films 501 and 502, parasitic capacitance between the conductive films 501 and 502 can be reduced.

Note that the conductive films 501 and 503 can be formed by processing one conductive film formed over a substrate 500 having an insulating surface into a desired shape. The semiconductor films 507, 520, and 523 can be formed by processing one semiconductor film formed over the gate insulating film 506 into a desired shape. The conductive films 502 and 504 can be formed by processing one conductive film formed over the gate insulating film 506 and the semiconductor films 507, 520, and 523 into a desired shape.

In the pixel in FIGS. 10A and 10B, an insulating film 512 is formed to cover the semiconductor films 507, 520, and 523 and the conductive films 502 and 504. Further, a conductive film 521 is formed over the insulating film 512 to be in contact with the conductive film 504 through a contact hole formed in the insulating film 512. An insulating film 513 is formed over the conductive film 521 and the insulating film 512. A first electrode 505 is formed over the insulating film 513. The conductive film 521 is in contact with the first electrode 505 through a contact hole formed in the insulating film 513.

Note that although the conductive film 504 is in contact with the first electrode 505 through the conductive film 521 in the pixel in FIGS. 10A and 10B, in one embodiment of the present invention, the conductive film 504 may be in contact with the first electrode 505 without the conductive film 521.

A portion where the conductive film 503 overlaps with the conductive film 504 with the gate insulating film 506 positioned therebetween functions as the capacitor 116.

In this embodiment, a spacer 510 is formed over the first electrode 505 in a portion where the conductive film 521 and the first electrode 505 overlap with each other.

FIG. 10A is a top view of the pixel provided with the spacer 510. In FIG. 10B, a substrate 514 is provided to face the substrate 500 provided with the spacer 510.

A second electrode 515 is provided for the substrate 514, and a liquid crystal layer 516 containing a liquid crystal is provided between the first electrode 505 and the second electrode 515. The liquid crystal element 113 is formed in a portion where the first electrode 505, the second electrode 515, and the liquid crystal layer 516 overlap with each other.

In the case of a transmissive liquid crystal display device, the first electrode 505 and the second electrode 515 can be formed using, for example, a light-transmitting conductive material such as indium tin oxide containing silicon oxide (ITSO), indium tin oxide (ITO), zinc oxide (ZnO), indium zinc oxide, or zinc oxide to which gallium is added (GZO). In the case of a reflective liquid crystal display device, the second electrode 515 can be formed using a reflective or light-blocking material such as titanium nitride, zirconium nitride, titanium, tungsten, nickel, platinum, chromium, silver, or aluminum.

An alignment film may be provided as appropriate between the first electrode 505 and the liquid crystal layer 516 or between the second electrode 515 and the liquid crystal layer 516. The alignment film can be formed using an organic resin such as polyimide or poly(vinyl alcohol). Alignment treatment for aligning liquid crystal molecules in a certain direction, such as rubbing, is performed on a surface of the alignment film. A roller wrapped with cloth of nylon or the like is rolled while being in contact with the alignment film so that the surface of the alignment film can be rubbed in a certain direction. Note that it is also possible to form the alignment film that has alignment characteristics with the use of an inorganic material such as silicon oxide by vapor deposition, without alignment treatment.

Injection of liquid crystals for formation of the liquid crystal layer 516 may be performed by a dispenser method (a dripping method) or a dipping method (a pumping method).

Note that the substrate 514 is provided with a light-blocking film 517 capable of blocking light so that disclination caused by disorder of alignment of the liquid crystals between pixels is prevented from being observed or dispersed light is prevented from entering a plurality of adjacent pixels. The light-blocking film 517 can be formed using an organic resin containing a black pigment such as a carbon black or low-valent titanium oxide. Alternatively, the light-blocking film 517 can be formed using a film including chromium.

Although FIGS. 10A and 10B illustrate the liquid crystal element 113 in which the liquid crystal layer 516 is provided between the first electrode 505 and the second electrode 515, the liquid crystal display device according to one embodiment of the present invention is not limited to this structure. A pair of electrodes may be formed over one substrate like an IPS liquid crystal element or a liquid crystal element exhibiting a blue phase.

Next, a specific structure example of the pixel 114 where the liquid crystal layer of the liquid crystal element includes a liquid crystal exhibiting a blue phase is described giving an example of the pixel 114 in FIG. 3B.

Figure 11A:
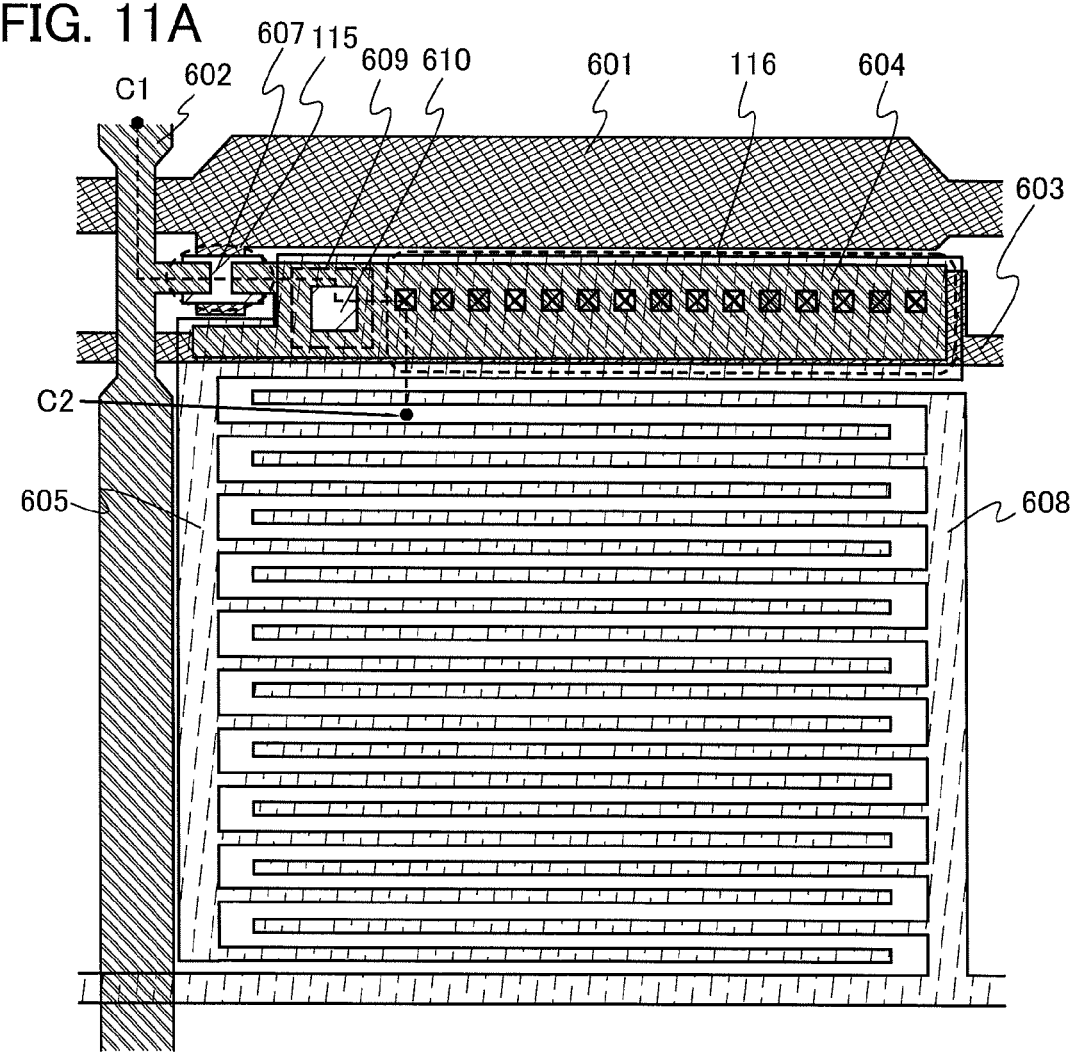
FIGS. 11A and 11B are a top view and a cross-sectional view of a pixel.
Figure 11B:
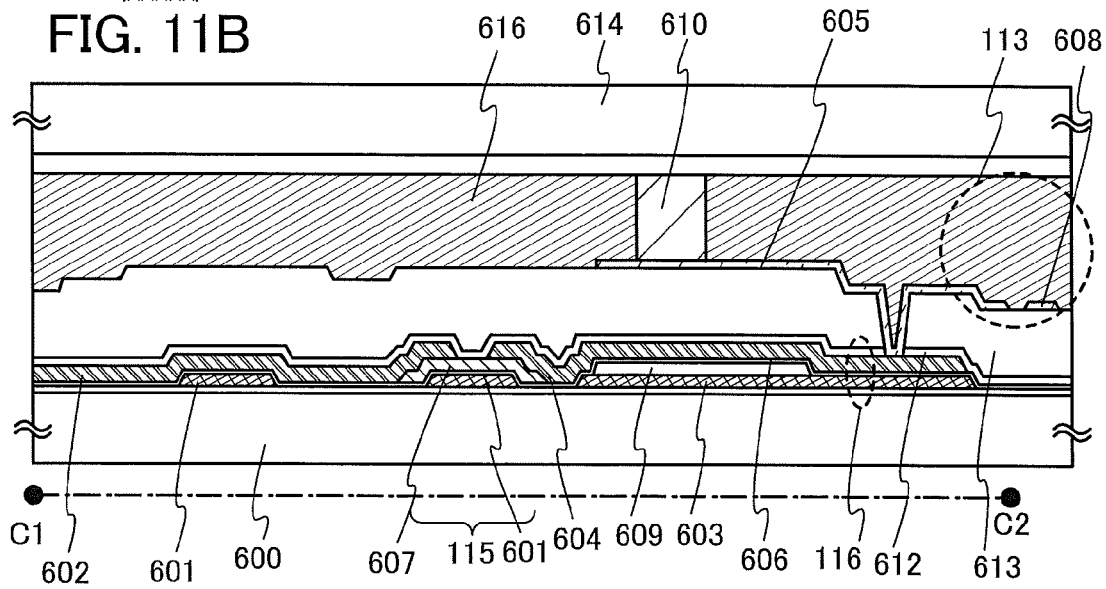

FIG. 11A illustrates an example of a top view of the pixel. Note that the top view in FIG. 11A does not illustrate insulating films, a liquid crystal layer, and a second electrode for clarity of the layout of the pixel 114. FIG. 11B is a cross-sectional view taken along broken line C1-C2 in FIG. 11A.

In the pixel in FIGS. 11A and 11B, a conductive film 601 functions as the scan line G or the gate of the transistor 115. A conductive film 602 functions as the signal line S or one of the source and the drain of the transistor 115. A conductive film 603 functions as one electrode of the capacitor 116. A conductive film 604 functions as the other of the source and the drain of the transistor 115 or the other electrode of the capacitor 116.

A gate insulating film 606 is formed over the conductive films 601 and 603. A semiconductor film 607 of the transistor 115 is formed over the gate insulating film 606 to overlap with the conductive film 601. Insulating films 612 and 613 are sequentially formed to cover the semiconductor film 607 and the conductive films 602 and 604. A first electrode 605 and a second electrode 608 are formed over the insulating film 613. The conductive film 604 and the first electrode 605 are connected to each other through a contact hole formed in the insulating films 612 and 613.

The conductive films 601 and 603 can be formed by processing one conductive film formed over a substrate 600 having an insulating surface into a desired shape. The gate insulating film 606 is formed over the conductive films 601 and 603. The conductive films 602 and 604 can be formed by processing one conductive film formed over the semiconductor film 607 and the gate insulating film 606 into a desired shape.

A portion where the conductive film 603 overlaps with the conductive film 604 with the gate insulating film 606 positioned therebetween functions as the capacitor 116.

In the pixel in FIGS. 11A and 11B, an insulating film 609 is formed between the conductive film 603 and the gate insulating film 606. Further, a spacer 610 is formed over the first electrode 605 in a portion where the first electrode 605 and the insulating film 609 overlap with each other.

FIG. 11A is a top view of the pixel provided with the spacer 610. In FIG. 11B, a substrate 614 is provided to face the substrate 600 provided with the spacer 610.

A liquid crystal layer 616 containing a liquid crystal is provided between the substrate 614, and the first electrode 605 and the second electrode 608. The liquid crystal element 113 is formed in a region including the first electrode 605, the second electrode 608, and the liquid crystal layer 616.

The first electrode 605 and the second electrode 608 can be formed using, for example, a light-transmitting conductive material such as indium tin oxide containing silicon oxide (ITSO), indium tin oxide (ITO), zinc oxide (ZnO), indium zinc oxide, or zinc oxide to which gallium is added (GZO).

Injection of liquid crystals for formation of the liquid crystal layer 616 may be performed by a dispenser method (a dripping method) or a dipping method (a pumping method).

Note that the substrate 614 may be provided with a light-blocking film capable of blocking light so that disclination caused by disorder of alignment of the liquid crystals between pixels is prevented from being observed or dispersed light is prevented from entering a plurality of adjacent pixels. The light-blocking film can be formed using an organic resin containing a black pigment such as a carbon black or low-valent titanium oxide. Alternatively, the light-blocking film can be formed using a film including chromium.

Note that in FIGS. 10A and 10B or FIGS. 11A and 11B, the semiconductor film 507 or 607 in the transistor 115 may include a wide-gap semiconductor such as an oxide semiconductor or may include an amorphous, microcrystalline, polycrystalline, or single crystal semiconductor of silicon, germanium, or the like.

Note that the transistor 115 includes at least a gate on one side of the semiconductor film 507 or 607. Alternatively, the transistor 115 may include a pair of gates with the semiconductor film 507 or 607 positioned therebetween. In addition, the transistor 115 may be a single-gate transistor that includes a single gate and a single channel formation region, or a multi-gate transistor that includes a plurality of gates electrically connected to each other and thus includes a plurality of channel formation regions.

This embodiment can be combined with any of the other embodiments as appropriate.

Embodiment 5

Figure 12A:
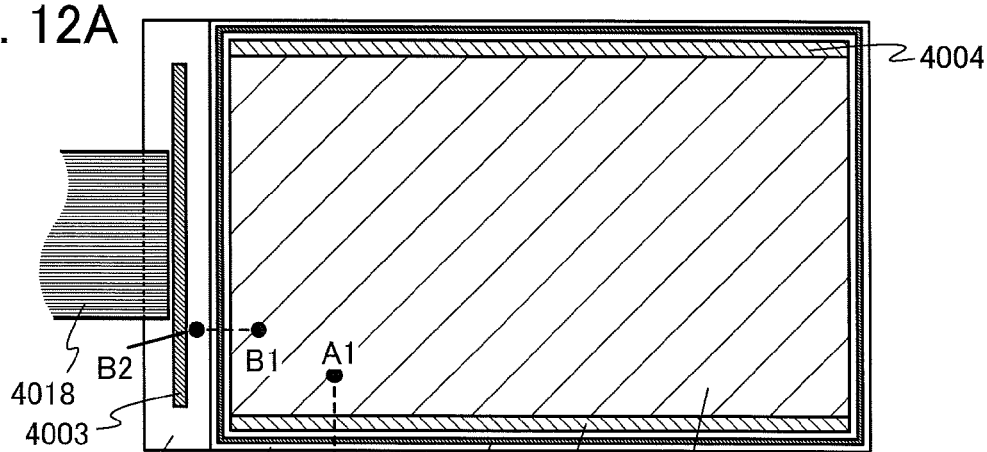
FIGS. 12A to 12C are a top view and cross-sectional views of a liquid crystal display device.
Figure 12B:
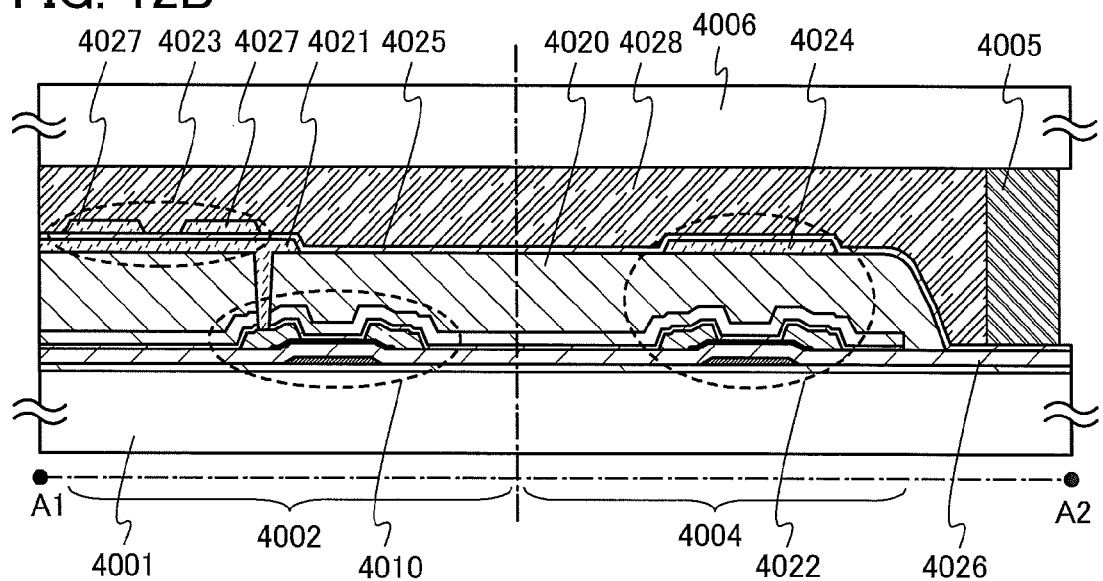
Figure 12C:
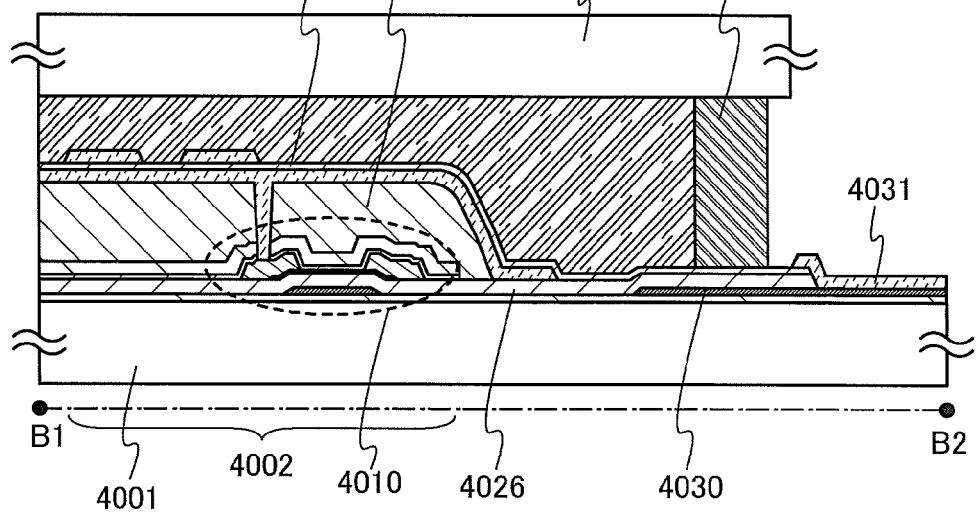

Next, an appearance of a liquid crystal display device according to one embodiment of the present invention is described with reference to FIGS. 12A to 12C. FIG. 12A is a top view of a liquid crystal display device where a substrate 4001 and a substrate 4006 are bonded to each other with a sealant 4005. FIG. 12B corresponds to a cross-sectional view taken along broken line A1-A2 in FIG. 12A. FIG. 12C corresponds to a cross-sectional view taken along broken line B1-B2 in FIG. 12A. Note that FIGS. 12A to 12C illustrate a fringe field switching (FFS) mode liquid crystal display device.

The sealant 4005 is provided to surround a pixel portion 4002 and a pair of scan line driver circuits 4004 provided over the substrate 4001. The substrate 4006 is provided over the pixel portion 4002 and the scan line driver circuit 4004. Thus, the pixel portion 4002 and the scan line driver circuit 4004 are sealed by the substrate 4001, the sealant 4005, and the substrate 4006.

A signal line driver circuit 4003 is mounted in a region which is different from a region surrounded by the sealant 4005 over the substrate 4001.

A plurality of transistors are included in the pixel portion 4002 and the scan line driver circuit 4004 provided over the substrate 4001. FIG. 12B illustrates a transistor 4010 included in the pixel portion 4002 and a transistor 4022 included in the scan line driver circuit 4004. FIG. 12C illustrates the transistor 4010 included in the pixel portion 4002.

In the pixel portion 4002 and the scan line driver circuit 4004, an insulating film 4020 formed using a resin is provided over the transistor 4010 and the transistor 4022. A first electrode 4021 of a liquid crystal element 4023 and a conductive film 4024 are provided over the insulating film 4020. The conductive film 4024 can function as a discharge path for electric charge accumulated in the insulating film 4020. Alternatively, the conductive film 4024 and the insulating film 4020 can be included as components of the transistor 4022, and the conductive film 4024 can function as a back gate.

An insulating film 4025 is provided over the insulating film 4020, the first electrode 4021, and the conductive film 4024. The insulating film 4025 preferably has a high effect of blocking diffusion of water, hydrogen, and the like. As the insulating film 4025, a silicon nitride film, a silicon nitride oxide film, or the like can be used.

As illustrated in FIGS. 12B and 12C, in one embodiment of the present invention, the insulating film 4020 is removed at an end portion of the panel. The insulating film 4025 over the insulating film 4020 is in contact with an insulating film 4026 functioning as a gate insulating film of each of the transistors 4010 and 4022 between the sealant 4005 and the substrate 4001.

In the case where the insulating film 4025 and the insulating film 4026 each have a high effect of blocking diffusion of water, hydrogen, and the like, when the insulating film 4025 is in contact with the insulating film 4026 at an end portion of the panel, entry of water, hydrogen, and the like from the end portion of the panel or the sealant 4005 into semiconductor films of the transistors 4010 and 4022 can be prevented.

A second electrode 4027 of the liquid crystal element 4023 is provided over the insulating film 4025. A liquid crystal layer 4028 is provided between the second electrode 4027 and the insulating film 4025, and the substrate 4006. The liquid crystal element 4023 includes the first electrode 4021, the second electrode 4027, and the liquid crystal layer 4028.

In the liquid crystal display device according to one embodiment of the present invention, the liquid crystal layer can be formed using, for example, a liquid crystal material classified into a thermotropic liquid crystal or a lyotropic liquid crystal. Alternatively, the liquid crystal layer can be formed using, for example, a liquid crystal material classified into a nematic liquid crystal, a smectic liquid crystal, a cholesteric liquid crystal, or a discotic liquid crystal. Alternatively, the liquid crystal layer can be formed using, for example, a liquid crystal material classified into a ferroelectric liquid crystal or an anti-ferroelectric liquid crystal. Alternatively, the liquid crystal layer can be formed using, for example, a liquid crystal material classified into a high-molecular liquid crystal such as a main-chain high-molecular liquid crystal, a side-chain high-molecular liquid crystal, or a composite-type high-molecular liquid crystal, or a low-molecular liquid crystal. Alternatively, the liquid crystal layer can be formed using, for example, a liquid crystal material classified into a polymer dispersed liquid crystal (PDLC).

Alternatively, a liquid crystal exhibiting a blue phase for which an alignment film is not used may be used for the liquid crystal layer. A blue phase is one of liquid crystal phases that is generated just before a cholesteric phase changes into an isotropic phase while the temperature of a cholesteric liquid crystal is increased. Since the blue phase is only generated within a narrow range of temperature, a chiral material or an ultraviolet curable resin is added so that the temperature range is improved. A liquid crystal composition including a liquid crystal exhibiting a blue phase and a chiral material is preferable because it has a short response time of 1 ms or less, and is optically isotropic, which makes the alignment process unneeded and viewing angle dependence small.

In the liquid crystal element 4023, alignment of liquid crystal molecules is changed in accordance with the level of voltage across the first electrode 4021 and the second electrode 4027, so that transmittance is changed. Accordingly, when the transmittance of the liquid crystal element 4023 is controlled by the potential of an image signal supplied to the first electrode 4021, gradation can be expressed.

Image signals from the signal line driver circuit 4003 and a variety of control signals and power supply potentials from an FPC 4018 are supplied to the scan line driver circuit 4004 or the pixel portion 4002 through lead wirings 4030 and 4031.

Although a fringe field switching (FFS) mode is used as a method for driving the liquid crystal in this embodiment, the following can be used as a method for driving the liquid crystal: a twisted nematic (TN) mode, a super twisted nematic (STN) mode, a vertical alignment (VA) mode, a multi-domain vertical alignment (MVA) mode, an in-plane-switching (IPS) mode, an optically compensated birefringence (OCB) mode, a blue phase mode, a transverse bend alignment (TBA) mode, a VA-IPS mode, an electrically controlled birefringence (ECB) mode, a ferroelectric liquid crystal (FLC) mode, an anti-ferroelectric liquid crystal (AFLC) mode, a polymer dispersed liquid crystal (PDLC) mode, a polymer network liquid crystal (PNLC) mode, a guest-host mode, an advanced super view (ASV) mode, and the like.

Figure 13A:
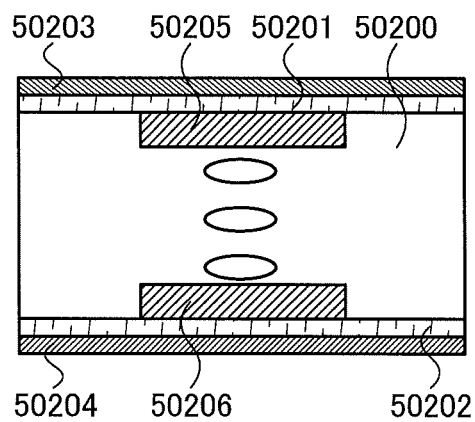
FIGS. 13A to 13F are cross-sectional views of liquid crystal elements.
Figure 13B:
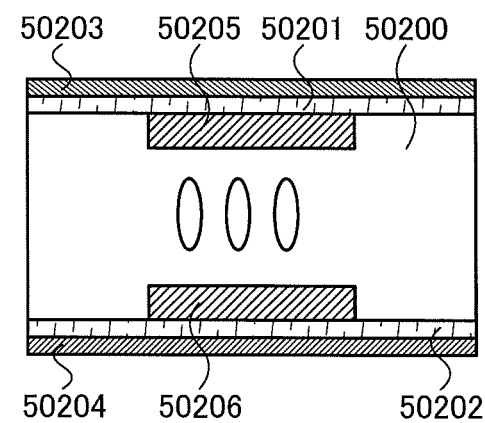

FIGS. 13A and 13B illustrate cross-sectional structure examples of a VA liquid crystal element.

A liquid crystal layer 50200 is provided between a first substrate 50201 provided with a transistor and a second substrate 50202. A first electrode 50205 is formed on the first substrate 50201. A second electrode 50206 is formed over the second substrate 50202. A first polarizing plate 50203 is provided over the first substrate 50201 on a side opposite to the liquid crystal layer 50200. A second polarizing plate 50204 is provided on the second substrate 50202 on a side opposite to the liquid crystal layer 50200. Note that the first polarizing plate 50203 and the second polarizing plate 50204 are provided to be in a cross nicol state.

FIG. 13A is a schematic view of a cross section where voltage is applied to the first electrode 50205 and the second electrode 50206 (referred to as a vertical electric field mode). Since liquid crystal molecules are aligned laterally, light emitted from a backlight is affected by birefringence of the liquid crystal molecules. In addition, since the first polarizing plate 50203 and the second polarizing plate 50204 are provided to be in a cross nicol state, light emitted from the backlight passes through the substrate.

FIG. 13B is a schematic view of a cross section where voltage is not applied to the first electrode 50205 and the second electrode 50206. Since liquid crystal molecules are aligned longitudinally, light emitted from the backlight is not affected by birefringence of the liquid crystal molecules. In addition, since the first polarizing plate 50203 and the second polarizing plate 50204 are provided to be in a cross nicol state, light emitted from the backlight does not pass through the substrate.

Figure 13C:
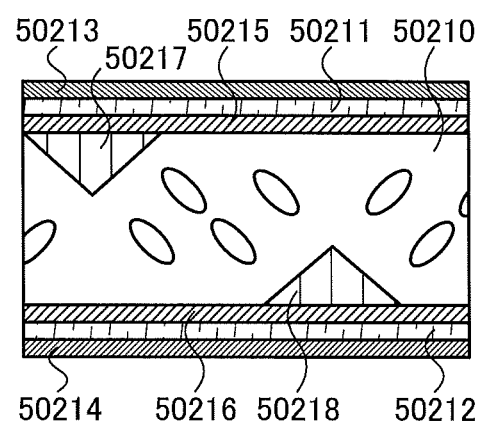

FIGS. 13C and 13C illustrate cross-sectional structure examples of an MVA liquid crystal element.

A liquid crystal layer 50210 is provided between a first substrate 50211 provided with a transistor and a second substrate 50212. A first electrode 50215 is formed on the first substrate 50211. A second electrode 50216 is formed over the second substrate 50212. A first projection 50217 for controlling alignment is formed on the first electrode 50215. A second projection 50218 for controlling alignment is formed over the second electrode 50216. A first polarizing plate 50213 is provided over the first substrate 50211 on a side opposite to the liquid crystal layer 50210. A second polarizing plate 50214 is provided on the second substrate 50212 on a side opposite to the liquid crystal layer 50210. Note that the first polarizing plate 50213 and the second polarizing plate 50214 are provided to be in a cross nicol state.

FIG. 13C is a schematic view of a cross section where voltage is applied to the first electrode 50215 and the second electrode 50216 (referred to as a vertical electric field mode). Since liquid crystal molecules are aligned to tilt toward the first projection 50217 and the second projection 50218, light emitted from a backlight is affected by birefringence of the liquid crystal molecules. In addition, since the first polarizing plate 50213 and the second polarizing plate 50214 are provided to be in a cross nicol state, light emitted from the backlight passes through the substrate.

Figure 13D:
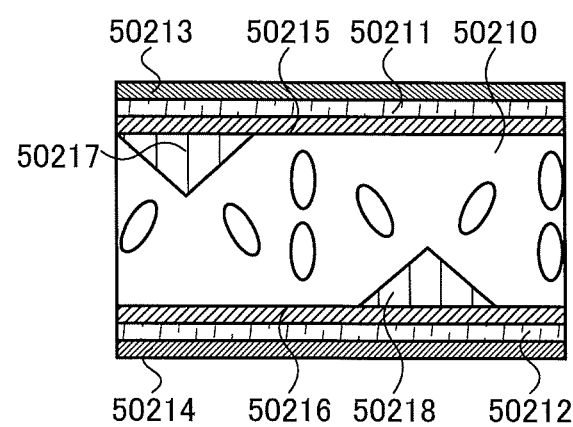

FIG. 13D is a schematic view of a cross section where voltage is not applied to the first electrode 50215 and the second electrode 50216. Since liquid crystal molecules are aligned longitudinally, light emitted from the backlight is not affected by birefringence of the liquid crystal molecules. In addition, since the first polarizing plate 50213 and the second polarizing plate 50214 are provided to be in a cross nicol state, light emitted from the backlight does not pass through the substrate.

Figure 13E:
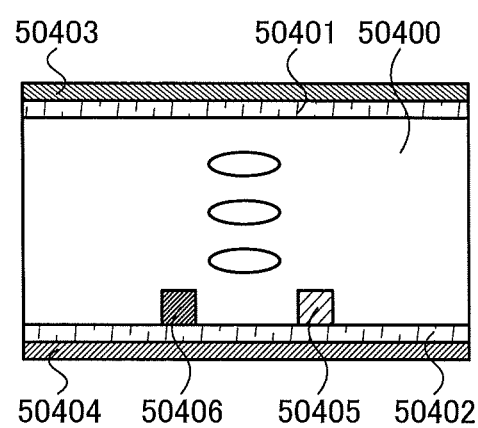
Figure 13F:
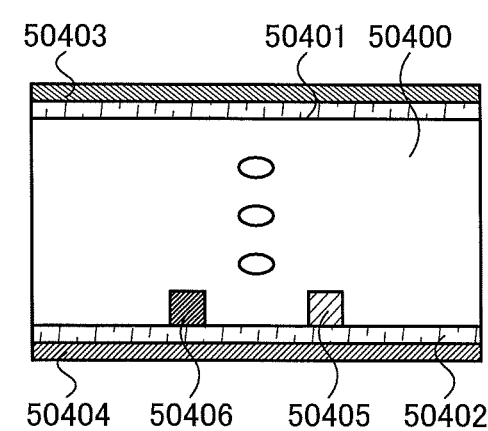

FIGS. 13E and 13F illustrate cross-sectional structure examples of an IPS liquid crystal element.

A liquid crystal layer 50400 is provided between a first substrate 50401 provided with a transistor and a second substrate 50402. A first electrode 50405 and a second electrode 50406 are formed over the second substrate 50402. A first polarizing plate 50403 is provided over the first substrate 50401 on a side opposite to the liquid crystal layer 50400. A second polarizing plate 50404 is provided on the second substrate 50402 on a side opposite to the liquid crystal layer 50400. Note that the first polarizing plate 50403 and the second polarizing plate 50404 are provided to be in a cross nicol state.

FIG. 13E is a schematic view of a cross section where voltage is applied to the first electrode 50405 and the second electrode 50406 (referred to as a vertical electric field mode). Since liquid crystal molecules are aligned along a line of electric force that is deviated from a rubbing direction, light emitted from a backlight is affected by birefringence of the liquid crystal molecules. In addition, since the first polarizing plate 50403 and the second polarizing plate 50404 are provided to be in a cross nicol state, light emitted from the backlight passes through the substrate.

FIG. 13F is a schematic view of a cross section where voltage is not applied to the first electrode 50405 and the second electrode 50406. Since liquid crystal molecules are aligned laterally in a rubbing direction, light emitted from the backlight is not affected by birefringence of the liquid crystal molecules. In addition, since the first polarizing plate 50403 and the second polarizing plate 50404 are provided to be in a cross nicol state, light emitted from the backlight does not pass through the substrate. Thus, black display is performed.

The liquid crystal display device according to one embodiment of the present invention may include an optical compensation layer for achieving a wide viewing angle. The optical compensation layer may have an optical indicatrix whose light axis is parallel to a surface of a panel, or may have a predetermine angle θ between the light axis of the optical indicatrix and the surface of the panel.

This embodiment can be combined with any of the other embodiments as appropriate.

Embodiment 6

A liquid crystal display device according to one embodiment of the present invention can consume less power. Thus, in the case of a portable electronic device that does not always receive power easily, such as a portable information terminal or a portable game machine, the use of the liquid crystal display device according to one embodiment of the present invention is preferable because long continuous operating time can be secured.

The liquid crystal display device according to one embodiment of the present invention can be used for display devices, personal computers, or image reproducing devices provided with recording media (typically, devices that reproduce the content of recording media such as digital versatile discs (DVDs) and have displays for displaying the reproduced images). Further, as electronic devices that can include the liquid crystal display device according to one embodiment of the present invention, cellular phones, game machines (including portable game machines), personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATMs), vending machines, and the like can be given. FIGS. 14A to 14E illustrate specific examples of these electronic devices.

Figure 14A:
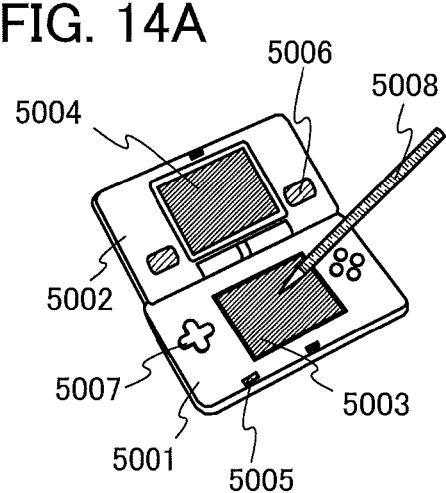
FIGS. 14A to 14E each illustrate an electronic device.

FIG. 14A illustrates a portable game machine, which includes a housing 5001, a housing 5002, a display portion 5003, a display portion 5004, a microphone 5005, speakers 5006, an operation key 5007, a stylus 5008, and the like. It is possible to use the liquid crystal display device according to one embodiment of the present invention as the display portion 5003 or 5004. Note that although the portable game machine in FIG. 14A has the two display portions 5003 and 5004, the number of display portions included in the portable game machine is not limited thereto.

Figure 14B:
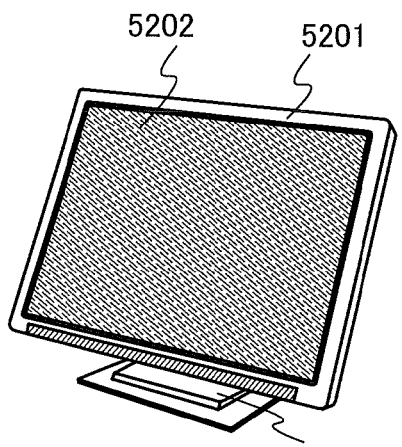

FIG. 14B illustrates a display device, which includes a housing 5201, a display portion 5202, a support 5203, and the like. It is possible to use the liquid crystal display device according to one embodiment of the present invention as the display portion 5202. Note that the display device means all display devices for displaying information, such as display devices for personal computers, for receiving TV broadcast, and for displaying advertisements.

Figure 14C:
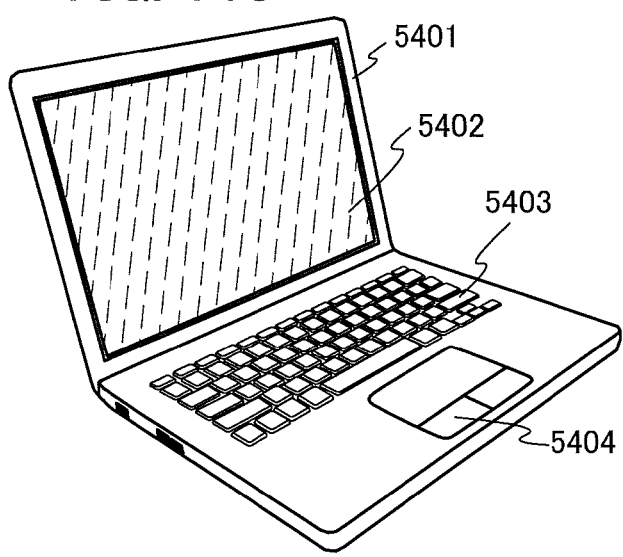

FIG. 14C illustrates a laptop, which includes a housing 5401, a display portion 5402, a keyboard 5403, a pointing device 5404, and the like. It is possible to use the liquid crystal display device according to one embodiment of the present invention as the display portion 5402.

Figure 14D:
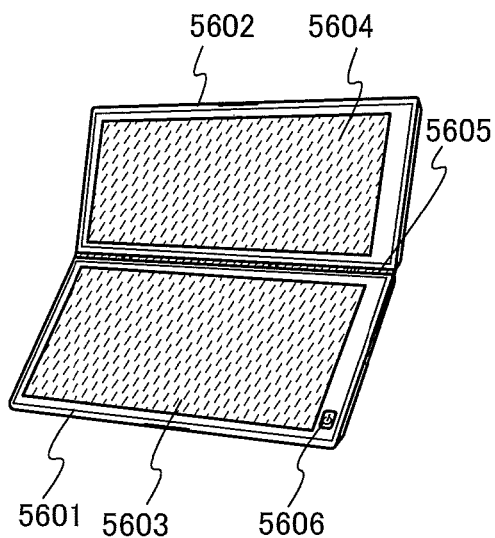

FIG. 14D illustrates a personal digital assistant, which includes a first housing 5601, a second housing 5602, a first display portion 5603, a second display portion 5604, a joint 5605, an operation key 5606, and the like. The first display portion 5603 is provided in the first housing 5601, and the second display portion 5604 is provided in the second housing 5602. The first housing 5601 and the second housing 5602 are connected to each other with the joint 5605, and an angle between the first housing 5601 and the second housing 5602 can be changed with the joint 5605. An image on the first display portion 5603 may be switched depending on the angle between the first housing 5601 and the second housing 5602 at the joint 5605. A liquid crystal display device with a position input function may be used as at least one of the first display portion 5603 and the second display portion 5604. Note that the position input function can be added by provision of a touch panel in a liquid crystal display device. Alternatively, the position input function can be added by provision of a photoelectric conversion element called a photosensor in a pixel portion of a liquid crystal display device. It is possible to use the liquid crystal display device according to one embodiment of the present invention as the first display portion 5603 or the second display portion 5604.

Figure 14E:
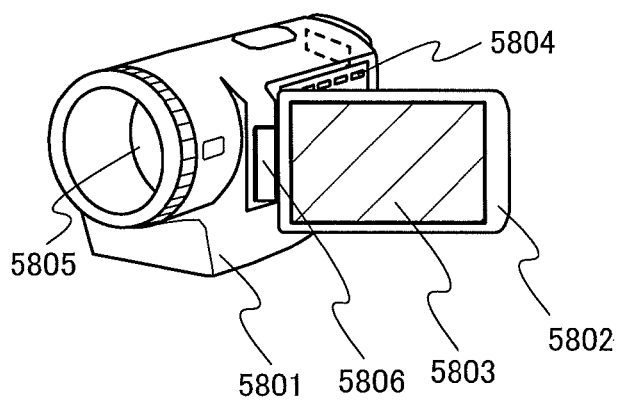

FIG. 14E illustrates a video camera, which includes a first housing 5801, a second housing 5802, a display portion 5803, operation keys 5804, a lens 5805, a joint 5806, and the like. The operation keys 5804 and the lens 5805 are provided in the first housing 5801, and the display portion 5803 is provided in the second housing 5802. The first housing 5801 and the second housing 5802 are connected to each other with the joint 5806, and an angle between the first housing 5801 and the second housing 5802 can be changed with the joint 5806. An image on the display portion 5803 may be switched depending on the angle between the first housing 5801 and the second housing 5802 at the joint 5806. It is possible to use the liquid crystal display device according to one embodiment of the present invention as the display portion 5803.

This embodiment can be combined with any of the other embodiments as appropriate.

This application is based on Japanese Patent Application serial No. 2012-157405 filed with Japan Patent Office on Jul. 13, 2012, the entire contents of which are hereby incorporated by reference.

What is claimed is:

1. A liquid crystal display device comprising:
a driver circuit comprising a first transistor;
a pixel comprising a second transistor and a liquid crystal element electrically connected to the second transistor; and
a light supply portion configured to sequentially supply light of a plurality of hues to the pixel,
wherein a first insulating film is over the second transistor,
wherein a first electrode of the liquid crystal element and a back gate of the first transistor are over the first insulating film,
wherein a second insulating film is over the first electrode of the liquid crystal element and the back gate of the first transistor,
wherein a second electrode of the liquid crystal element is over the second insulating film, and
wherein a polarity of an image signal input to the pixel is inverted every more than three consecutive frame periods.

2. The liquid crystal display device according to claim 1, further comprising:
a counter configured to count the number of frame periods; and
a controller configured to invert the polarity of the image signal input to the pixel in accordance with the number of frame periods counted by the counter.

3. The liquid crystal display device according to claim 2, further comprising a signal generator configured to determine timing of inverting the polarity of the image signal input to the pixel by using data on the number of frame periods counted by the counter.

4. The liquid crystal display device according to claim 1, wherein the second transistor comprises an oxide semiconductor film comprising a channel formation region.

5. The liquid crystal display device according to claim 4, wherein the liquid crystal element comprises a liquid crystal layer comprising a liquid crystal exhibiting a blue phase.

6. The liquid crystal display device according to claim 4, wherein the oxide semiconductor film comprises In and Zn.

7. A liquid crystal display device comprising:
a driver circuit comprising a first transistor;
a first pixel comprising a second transistor and a liquid crystal element electrically connected to the second transistor;
a second pixel; and
a light supply portion configured to concurrently supply light of different hues to the first pixel and the second pixel and sequentially supply light of a plurality of hues to each of the first pixel and the second pixel,
wherein a first insulating film is over the second transistor,
wherein a first electrode of the liquid crystal element and a back gate of the first transistor are over the first insulating film,
wherein a second insulating film is over the first electrode of the liquid crystal element and the back gate of the first transistor,
wherein a second electrode of the liquid crystal element is over the second insulating film, and
wherein a polarity of image signals input to the first pixel and the second pixel is inverted every more than three consecutive frame periods.

8. The liquid crystal display device according to claim 7, further comprising:
a counter configured to count the number of frame periods; and a controller configured to invert the polarity of the image signals input to the first pixel and the second pixel in accordance with the number of frame periods counted by the counter.

9. The liquid crystal display device according to claim 8, further comprising a signal generator configured to determine timing of inverting the polarity of the image signals input to the first pixel and the second pixel by using data on the number of frame periods counted by the counter.

10. The liquid crystal display device according to claim 7, wherein the second transistor comprises an oxide semiconductor film comprising a channel formation region.

11. The liquid crystal display device according to claim 10, wherein the liquid crystal element comprises a liquid crystal layer comprising a liquid crystal exhibiting a blue phase.

12. The liquid crystal display device according to claim 10, wherein the oxide semiconductor film comprises In and Zn.

* * * * *